(12) United States Patent
Braier et al.

(10) Patent No.: US 9,199,745 B2
(45) Date of Patent: Dec. 1, 2015

(54) SYSTEM AND METHOD FOR TRANSFERRING AIRPLANES

(75) Inventors: Ran Braier, Shoham (IL); Arie Perry, Hod Hasharon (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 452 days.

(21) Appl. No.: 12/619,130

(22) Filed: Nov. 16, 2009

(65) Prior Publication Data

US 2010/0096494 A1 Apr. 22, 2010

Related U.S. Application Data

(63) Continuation of application No. PCT/IL2008/000036, filed on Jan. 8, 2008, and a continuation-in-part of application No. 11/798,777, filed on May 16, 2007, now Pat. No. 8,245,980.

(51) Int. Cl.
*B64F 1/22* (2006.01)

(52) U.S. Cl.
CPC . *B64F 1/22* (2013.01); *B64F 1/227* (2013.01); *B64F 1/228* (2013.01); *Y02T 50/826* (2013.01)

(58) Field of Classification Search
CPC ............ B64F 1/22; B64F 1/227; B64F 1/228; Y02T 50/826
USPC ...................... 244/50, 70, 189; 414/426, 427
See application file for complete search history.

(56) References Cited

U.S. PATENT DOCUMENTS

| | | | |
|---|---|---|---|
| 2,539,010 A | 1/1951 | Cox | |
| 2,751,990 A | 6/1956 | Finlay et al. | |
| 2,957,650 A | * 10/1960 | Stanley et al. | ................... 244/50 |
| 2,966,222 A | * 12/1960 | Lambert, Jr. | ................... 254/2 R |
| 3,064,746 A | 11/1962 | Williamson | |

(Continued)

FOREIGN PATENT DOCUMENTS

| | | |
|---|---|---|
| CN | 2458238 Y | 11/2001 |
| CN | 1511759 A | 7/2004 |

(Continued)

OTHER PUBLICATIONS

International Search Report issued in International Application No. PCT/IL2008/00459 on Nov. 6, 2008.

(Continued)

*Primary Examiner* — Valentina Xavier
(74) *Attorney, Agent, or Firm* — Oliff PLC

(57) ABSTRACT

Disclosed a method of transferring airplanes and an unmanned airplane transfer system. The transfer system comprises a transfer module adapted to transfer an airplane by moving a landing gear of the airplane; and a controller being assembled with the transfer system, coupled to the transfer module, and adapted to i) receive a transfer signal; ii) to control the transfer module in response to the transfer signal; and iii) to coordinate transferring the airplane by the unmanned airplane transfer system and at least one second unmanned airplane transfer system. The method of transferring an airplane by a plurality of unmanned airplane transfer systems comprises receiving by at least one unmanned airplane transfer system among said plurality of transfer systems a transfer signal, and in response to the transfer signal, coordinating the transfer of the airplane by at least two unmanned airplane transfer systems among said plurality of transfer systems.

27 Claims, 29 Drawing Sheets

(56) References Cited

U.S. PATENT DOCUMENTS

| | | |
|---|---|---|
| 3,279,722 A | 10/1966 | Glover, Jr. et al. |
| 4,007,890 A | 2/1977 | Bremer et al. |
| 4,036,384 A | 7/1977 | Johnson |
| 4,113,041 A | 9/1978 | Birkeholm |
| 4,122,960 A | 10/1978 | Bauer et al. |
| 4,225,279 A | 9/1980 | Boyer |
| 4,237,994 A | 12/1980 | McColl |
| 4,375,244 A | 3/1983 | Morin |
| 4,482,961 A | 11/1984 | Kilner et al. |
| 4,632,625 A | 12/1986 | Schuller et al. |
| 4,658,924 A | 4/1987 | Dobbie |
| 4,730,685 A | 3/1988 | Sinkkonen |
| 4,745,410 A | 5/1988 | Schuller et al. |
| 4,810,157 A | 3/1989 | Schopf |
| 4,836,734 A | 6/1989 | Pollner et al. |
| 4,842,220 A * | 6/1989 | Versteeg ............ 244/50 |
| 4,911,603 A | 3/1990 | Pollner et al. |
| 4,911,604 A | 3/1990 | Pollner et al. |
| 4,913,253 A | 4/1990 | Bowling |
| 4,917,563 A | 4/1990 | Pollner et al. |
| 4,917,564 A | 4/1990 | Pollner et al. |
| 4,923,253 A | 5/1990 | Pollner et al. |
| 4,950,121 A | 8/1990 | Meyer et al. |
| 4,976,499 A | 12/1990 | Guichard et al. |
| 4,994,681 A | 2/1991 | Mann |
| 4,997,331 A | 3/1991 | Grinsted et al. |
| 5,013,205 A | 5/1991 | Schardt |
| 5,048,625 A | 9/1991 | Birkeholm |
| 5,051,052 A | 9/1991 | Franken et al. |
| 5,054,714 A | 10/1991 | Franken et al. |
| 5,078,340 A | 1/1992 | Anderberg |
| 5,082,082 A | 1/1992 | Hvolka |
| 5,110,067 A | 5/1992 | Sinkkonen |
| 5,151,003 A | 9/1992 | Zschoche |
| 5,176,341 A | 1/1993 | Ishikawa et al. |
| 5,202,075 A | 4/1993 | Barnard et al. |
| 5,219,033 A | 6/1993 | Pollner et al. |
| 5,259,572 A | 11/1993 | Franken et al. |
| 5,261,778 A | 11/1993 | Zschoche |
| 5,302,074 A | 4/1994 | Elfstrom |
| 5,302,075 A | 4/1994 | Zschoche |
| 5,302,076 A | 4/1994 | Bammel et al. |
| 5,308,212 A | 5/1994 | Pollner et al. |
| 5,314,287 A | 5/1994 | Wichert |
| 5,346,354 A | 9/1994 | Hellstrom |
| 5,381,987 A | 1/1995 | Carns |
| 5,480,274 A | 1/1996 | Franken et al. |
| 5,511,926 A | 4/1996 | Iles |
| 5,516,252 A | 5/1996 | Francke et al. |
| 5,549,436 A | 8/1996 | Fresia |
| 5,562,388 A | 10/1996 | Le Gall et al. |
| 5,655,733 A | 8/1997 | Roach |
| 5,680,125 A | 10/1997 | Elfstrom et al. |
| 5,860,785 A | 1/1999 | Eberspacher |
| 6,209,671 B1 | 4/2001 | Klein et al. |
| 6,283,696 B1 | 9/2001 | Trummer et al. |
| 6,301,529 B1 | 10/2001 | Itoyama et al. |
| 6,305,484 B1 | 10/2001 | Leblanc |
| 6,352,130 B2 | 3/2002 | Klein et al. |
| 6,352,318 B1 | 3/2002 | Hosomi et al. |
| 6,357,989 B1 | 3/2002 | Iles |
| 6,390,762 B1 | 5/2002 | Peery et al. |
| 6,405,975 B1 | 6/2002 | Sankrithi et al. |
| 6,543,790 B2 | 4/2003 | Johnson |
| 6,600,992 B2 | 7/2003 | Dow |
| 6,675,920 B1 | 1/2004 | Diez et al. |
| 6,739,822 B2 | 5/2004 | Johansson |
| 6,751,588 B1 | 6/2004 | Menendez-Pidal et al. |
| 6,923,281 B2 | 8/2005 | Chernoff et al. |
| 6,945,354 B2 | 9/2005 | Goff |
| 8,181,725 B2 | 5/2012 | Andres et al. |
| 2002/0173904 A1 | 11/2002 | Dow |
| 2003/0047362 A1 | 3/2003 | Chernoff et al. |
| 2003/0095854 A1 | 5/2003 | Abela |
| 2005/0196256 A1 | 9/2005 | Rodenkirch et al. |
| 2006/0056949 A1 | 3/2006 | Eckert |
| 2006/0278756 A1 | 12/2006 | Marshall |
| 2008/0083851 A1 | 4/2008 | Perry et al. |
| 2009/0183499 A1 | 7/2009 | Boorse |
| 2011/0127366 A1 | 6/2011 | Becker |

FOREIGN PATENT DOCUMENTS

| | | |
|---|---|---|
| DE | 33 27 628 A1 | 2/1985 |
| DE | 33 27 629 A1 | 2/1985 |
| DE | 35 21 429 A1 | 12/1986 |
| DE | 35 34 045 A1 | 4/1987 |
| DE | 38 44 744 C2 | 9/1988 |
| DE | 39 28 854 A1 | 3/1991 |
| DE | 40 07 610 A1 | 9/1991 |
| DE | 40 09 419 A1 | 9/1991 |
| DE | 41 02 861 A1 | 8/1992 |
| DE | 41 31 649 A1 | 3/1993 |
| DE | 43 24 211 A1 | 1/1995 |
| DE | 43 40 919 A1 | 3/1995 |
| DE | 44 46 047 A1 | 7/1996 |
| DE | 44 46 048 A1 | 7/1996 |
| DE | 197 34 238 A1 | 2/1998 |
| EP | 0 235 845 A1 | 9/1987 |
| EP | 0 649 787 A1 | 4/1995 |
| EP | 1 190 947 A1 | 3/2002 |
| EP | 1 623 924 A1 | 2/2006 |
| EP | 1 634 808 A1 | 3/2006 |
| FR | 2 581 965 A1 | 11/1986 |
| FR | 2 675 919 A1 | 10/1992 |
| FR | 2 911 658 A1 | 7/2008 |
| GB | 1 249 465 | 10/1971 |
| JP | A-56-2237 | 1/1981 |
| JP | A-57-70741 | 5/1982 |
| JP | A-2-279497 | 11/1990 |
| JP | A-4-138997 | 5/1992 |
| JP | A-2001-505512 | 4/2001 |
| JP | A-2003-189412 | 7/2003 |
| RU | 2 302 980 C2 | 8/2003 |
| RU | 2 271 316 C2 | 6/2004 |
| WO | WO 85/00790 A1 | 2/1985 |
| WO | WO 89/03343 A1 | 4/1989 |
| WO | WO 90/11932 A1 | 10/1990 |
| WO | WO 93/13985 A1 | 7/1993 |
| WO | WO 98/25822 A1 | 6/1998 |
| WO | WO 98/52822 | 11/1998 |
| WO | WO 2004/028903 A1 | 4/2004 |
| WO | WO 2004/114252 | 12/2004 |
| WO | WO 2008/038270 A2 | 4/2008 |
| WO | WO 2010/012261 A2 | 2/2010 |

OTHER PUBLICATIONS

Written Opinion of the International Searching Authority issued in International Application No. PCT/IL2008/00459 on Nov. 6, 2008.
International Search Report issued in International Application No. PCT/IL2008/000036 on Oct. 14, 2008.
Written Opinion of the International Searching Authority issued in International Application No. PCT/IL2008/000036 on Oct. 14, 2008.
Office Action issued in U.S. Appl. No. 11/798,777 in the name of Perry et al.; Dated Apr. 12, 2011.

* cited by examiner receiving a transfer signal responsive of a steering induced movement of landing gear holder. The landing gear holder firmly grips a landing gear of the airplane, and is pivotally connected to a structural element of the unmanned airplane transfer system. 610

transferring an airplane, by an unmanned airplane transfer system, in response to the transfer signal. 620 dumping energy resulting from a fast change in a velocity of the airplane. 630

SYSTEM AND METHOD FOR TRANSFERRING AIRPLANES

This is a Continuation of International Application No. PCT/IL2008/000036 filed Jan. 8, 2008, which claims the benefit of U.S. patent application Ser. No. 11/798,777 filed May 16, 2007. The disclosure of the prior applications is hereby incorporated by reference herein in its entirety.

FIELD OF THE INVENTION

The present invention relates to systems and methods for transferring airplanes.

BACKGROUND OF THE INVENTION

In modern airports the terminal is located relatively far from the runaways. Airplanes use their jet engines to travel from the terminal to a runaway (said operation is also known as taxi-out) and to travel from a runway to the terminal (said operation is also known as taxi-in).

These jet engines are very noisy, cause safety hazards, burn large quantities of fuel and cause to significant air pollution, the emission of large quantities of $CO_2$.

Taxi traffic delay is the largest of all aviation movements delay, the average taxi-out delay in minutes per flight is approximately twice the airborne delay. Although aircraft burn roughly 5 times faster when airborne, crew and equipment costs make the spend rate for taxiing aircraft about ⅔ that for airborne aircraft. Consequently, the cost of taxi-out delay exceeds that of airborne delay by about ⅓, totaling more than 1B$ annually. By automated tower controlled ground movement, one shall save significantly on taxi delays, which make significant annual cost. This shall add to the savings from fuel burned during taxi performed by towing tractors or robots.

Jet fuel is one of the two largest airlines operating expenses (the other being labor cost), constituting 25-30% of typical airline annual operation cost. Therefore, saving in fuel consumption is one of the major efforts for all airlines today. Jet fuel prices increased from less than 1$/gal in 2001 to 2$/gal in 2006 and is expected to reach 2.5 $/gal or higher by 2010, making the issue critical for the airline industry.

During taxi, typical aircraft fuel consumption is about 3200 lbs per hour (9.0 gallon per minute). Typical taxi-out time today is 30 minutes and rising constantly with the increase of air traffic all over the world. On average, typically, taxi-out time is 3 times longer than taxi-in time. Thus, a minimum of 40 minutes of taxi-out plus taxi-in time burn 360 gallons of fuel on airport grounds per flight, and this number is growing.

Air pollution in airports evolved into a major and significant hazard, and it keeps evolving due to the increment in air traffic worldwide. Gas emission in a jet engine is around 8 Kg of $CO_2$ per gallon. In a typical 40 minutes taxi-out plus taxi-in time, an aircraft emits 2.9 ton of $CO_2$, a very critical issue.

By 2010, the forecast is of more than one billion (1B) air travels, or around fifteen million (15M) flights a year, only in the US, not relating to the worldwide air traffic. For every 100 gallon of fuel saved during taxiing per flight, it is about 3.0 B$ in fuel and 12 M ton in $CO_2$ emission, in the US.

A typical busy airport has more than 1000 departures a day or around 400,000 flights a year. Every 100 gallon of fuel saved per flight, transfers in 40M gallon fuel saved per year per airport, or 80M$ yearly savings in fuel expenditure per airport (2$/gal today), actual savings being much higher.

In order to reduce the usage of jet engines various airplane towing systems were provided. Some are illustrated in the following patents and patent applications, all being incorporated herein by reference: U.S. Pat. No. 6,305,484 of Leblanc; U.S. Pat. No. 5,219,033 of Pollner et al.; U.S. Pat. No. 5,314,287 of Wichert; U.S. Pat. No. 5,860,785 of Eberspacher; U.S. Pat. No. 6,283,696 of Trummer et al.; U.S. Pat. No. 6,352,130 of Klein et al.; U.S. Pat. No. 6,543,790 of Johnson; U.S. Pat. No. 6,675,920 of Diez et al.; U.S. Patent application publication serial number 2006/0056949 of Eckert; U.S. Patent application publication serial number 2003/095854 of Abela; U.S. Patent application publication serial number 2005/196256 of Rodenkirch et al.; European patent application 649787A1 of Michelson et al and PCT patent application publication serial number WO/04028903A1 of Maggiori.

There is a need to provide an efficient method and system for transferring an airplane.

SUMMARY OF THE PRESENT INVENTION

An unmanned airplane transfer system is provided. The system includes a transfer module adapted to transfer an airplane, and a controller, coupled to the transfer module, adapted to receive a transfer signal responsive of a movement of an airplane control component and in response control the transfer module.

Conveniently, the unmanned airplane transfer system includes a sensor adapted to sense a steering control induced movement of the landing gear and in response provide a transfer signal to the controller.

Conveniently, the system is adapted to sense a movement of the airplane control component.

Conveniently, the steering commands are sensed by a sensor adapted to sense control induced movements of the landing gear.

Conveniently, steering commands are obtained either directly or indirectly from at least one airplane control component (such as a flight control stick, throttle, pedal, steering wheel) and the airplane is transferred in response to these steering commands. An airplane control component can affect the airborne or ground movement of the airplane, especially when the airplane can autonomously move.

Conveniently, the unmanned airplane transfer system includes: (i) a transfer module adapted to support a landing gear of an airplane and to transfer the airplane; (ii) a sensor adapted to sense steering control induced movements of the landing gear or the other airplane control devices (such as a flight control stick, throttle, pedal, steering wheel); and (iii) a controller, connected to the sensor and to the transfer module, adapted to receive at least one detection signal from the at least one sensor and in response control the transfer module.

Conveniently, the controller is further adapted to be remotely controlled.

Conveniently, the transfer module includes multiple independently controlled wheels.

Conveniently, the unmanned airplane transfer system includes an audio interface adapted to receive modulated audio signals representative of steering commands from the airplane and control the transfer module in response to these steering commands.

Conveniently, the system includes location sensors connected to the controller and the controller is adapted to control the transfer module in response to a location of the system.

Conveniently, the controller is connected to a manual, on board, control module and it is adapted to control the transfer module in response to commands provided by the manual control module.

A method for transferring an airplane that includes: receiving a transfer signal responsive of a movement of an airplane control component; and transferring an airplane, by an unmanned airplane transfer system, in response to the transfer signal.

Conveniently, the receiving includes sensing a movement of the airplane control components and generating a transfer signal.

Conveniently, the receiving includes sensing, by an unmanned airplane transfer system, steering control induced movements of a landing gear of the airplane.

A method for transferring an airplane, the method includes: (i) sensing, by an unmanned airplane transfer system, steering control induced rotational movements of a landing gear of the airplane; and (ii) transferring an airplane, by the unmanned airplane transfer system, in response to the sensed steering control induced movements of a landing gear.

Conveniently, the method includes receiving control signals representative of a command to alter a velocity of the airplane and whereas the transferring is responsive to the command.

Conveniently, the transferring is further responsive to remotely transmitted commands.

Conveniently, the transferring includes independently controlling at least two independently controlled wheels.

Conveniently, the method includes receiving modulated audio signals representative of steering commands and wherein the transferring is responsive to these commands.

Conveniently, the method includes determining a location of the towed airplane and wherein the transferring system is responsive to the sensed location.

Conveniently, the method includes receiving commands from an operator and wherein the transferring is responsive to the received commands.

An unmanned airplane transfer system, the system includes: a transfer module adapted to transfer an airplane by applying skid steering; and a controller, adapted to receive steering control signals and velocity control signals and in response control the transfer module; wherein the unmanned airplane transfer system is adapted to be aligned with the landing gear during rotational movements of the airplane.

Conveniently, the system includes a sensor adapted to sense steering control induced movements of the landing gear; and to provide the controller steering control signals.

Conveniently, the system is adapted to control a velocity of the airplane in response to velocity commands from the pilot.

Conveniently, the controller is further adapted to be remotely controlled.

Conveniently, the unmanned airplane transfer system includes an audio interface adapted to receive modulated signals representative of steering commands from the airplane and to send these modulated signals to the controller that is adapted to control the transfer module in response to the audio commands.

Conveniently, the system further includes location sensors coupled to the controller, wherein the controller is adapted to control the transfer module in response to a location of the system.

Conveniently, the controller is adapted to sense a system failure and in response to detach the system from the airplane.

Conveniently, the controller is connected to a manual control module and wherein the controller is adapted to control the transfer module in response to commands provided by the manual control module.

A method for transferring an airplane, the method includes: receiving steering control signals and velocity control signals; and in response transferring the airplane by an unmanned airplane transfer system by applying skid steering and maintaining an alignment between the unmanned airplane transfer system and the airplane during rotational movements of the airplane.

Conveniently, the receiving includes receiving velocity commands from the pilot

Conveniently, the transferring is further responsive to remotely transmitted commands.

Conveniently, the method further includes receiving audio commands.

Conveniently, the method includes determining a location of the airplane and wherein the transferring is responsive to the sensed location.

Conveniently, the method includes detecting an obstacle and providing an obstacle indication.

Conveniently, the method includes receiving commands from an operator, a safety driver sitting in the robot in time of emergency, during maintenance operations or a like, and wherein the transferring is responsive to the received commands.

According to an embodiment of the invention an unmanned airplane transfer system is provided. The system includes: (i) a transfer module adapted to transfer an airplane; (ii) a landing gear holder, adapted to firmly grip a landing gear of the airplane; wherein the landing gear holder is pivotally connected to a structural element of the unmanned airplane transfer system; and (iii) a controller, coupled to the transfer module, adapted to control the transfer module in response to a steering induced movement of the landing gear holder.

Conveniently, the system includes a sensor, adapted to sense the steering induced movements of the landing gear holder.

Conveniently, the system includes a shock absorber, connected to the structural element.

Conveniently, the structural element is connected to movable elements.

Conveniently, the structural element is connected to shock absorbers connected to movable elements.

According to an embodiment of the invention a method for transferring an airplane is provided. The method includes: (i) receiving a transfer signal responsive of a steering induced movement of landing gear holder, wherein the landing gear holder firmly grips a landing gear of the airplane, and is pivotally connected a structural element of the unmanned airplane transfer system; and (ii) transferring an airplane, by the unmanned airplane transfer system, in response to the transfer signal.

Conveniently, the method includes sensing the steering induced movement of the landing gear holder.

Conveniently, the method includes dumping energy resulting from a fast change in a velocity of the airplane.

BRIEF DESCRIPTION OF THE DRAWINGS

The present invention will be understood and appreciated more fully from the following detailed description taken in conjunction with the drawings in which:

FIG. 18 illustrates a method for transferring an airplane according to an embodiment of the invention;

DETAILED DESCRIPTION OF THE DRAWINGS

Figure 1:
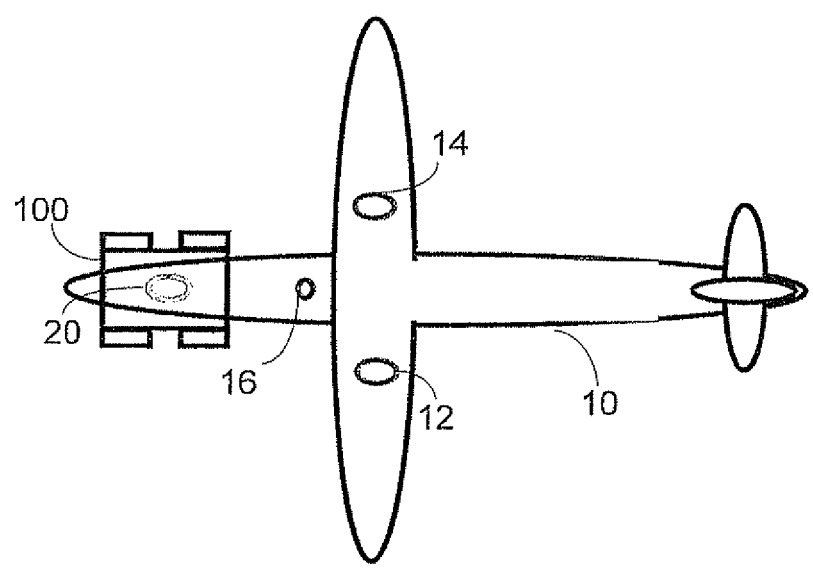
FIGS. 1 and 2 illustrate an airplane that is being transferred by an unmanned airplane transfer system, according to an embodiment of the invention.

According to an embodiment of the invention an unmanned airplane transfer system is provided. The system is controlled by one or more airplane control component (such as a flight control stick, throttle, pedal, steering wheel) and the airplane is transferred in response to these steering commands. An airplane control component can affect the airborne or ground movement of the airplane, especially when the airplane can autonomously move.

Conveniently, a virtual or physical movement of one or more airplane transfer control components can be tracked, such as the flight control stick that is used to control the airborne velocity or the ground velocity of the airplane. It is noted that the tracking can be done by electro-optical components, by electrical components, by adding a tracking device on the control panel, within the control panel, in connection to one of the airplanes computers and the like Conveniently, an unmanned airplane transfer system is provided. The system includes a transfer module adapted to transfer an airplane, and a controller, connected to the transfer module, adapted to receive a transfer signal responsive of a movement of an airplane control component and in response control the transfer module.

Conveniently, the system is adapted to sense a movement of the airplane control component.

Conveniently, the steering commands are sensed by a sensor adapted to sense control induced movements of the landing gear.

Pilot can control the ground movement of an airplane by using one or more airplane transfer control components. The control can involve sending steering commands (which dictate the direction of the airplane) and velocity related commands (that dictate the speed of the airplane).

Conveniently, airplane transfer is controlled in response to mechanical movements of an airplane or of its landing gear. Steering commands can be sensed by monitoring rotational movements of the landing gear about its axis. The system and method receive commands from the cockpit to alter the velocity of the airplane and in response can alter the velocity of the unmanned airplane transfer system.

Conveniently, the landing gear includes a safety pin that once is stuck in the landing gear allows the landing gear to be rotated by the unmanned airplane transfer system. This safety pin is removed once the plane is about to take off. The pin removal can be done during a last preflight check that is also known as last minute check, in a last minute check area. This last minute check area can also include means of applying fire extinguishing means and the like. It is noted that the pilot can initiate the jet engines prior to the last minute check area and while the safety pin is still stuck in the landing gear.

According to an embodiment of the invention the unmanned airplane transport system uses skid steering and conveniently also places the landing gear at the geometrical center of the unmanned airplane transfer system. Accordingly, the wheels of the unmanned airplane transport system are fixed, with no steering means, but their speed and optionally the direction of their rotation can be controlled such that the wheels on one side of the system can be rotated independently from the wheels of the other side of the system. Conveniently, the landing gear can be rotated along its axes by using the skid steering. Conveniently, the unmanned airplane transfer system is aligned with the landing gear during rotational movements of the landing gear.

Conveniently, a pilot can use the same steering control unit when being transferred by an unmanned airplane transfer system and when the plane autonomously moves on the ground by means of its jet engines as performed in regular taxi. According to another embodiment of the invention, the pilot can use the pilot flight control stick for steering and velocity change. According to another embodiment of the invention the same steering control unit is used for sending controls to the unmanned airplane transfer system and while the plane autonomously moves on the ground. In both of these alternative embodiments the commands can be sent to the unmanned airplane transfer system by wire, in a wireless manner and the like.

According to an embodiment of the invention the velocity of the unmanned airplane transfer system is controlled by the pilot. The control can be executed by using a dedicated control knob, handle, stick or device.

Conveniently, the unmanned airplane transfer system is fully automated. The unmanned airplane transfer system also can be manually controlled. Additionally or alternatively, the unmanned airplane transfer system can be remotely controlled. A central control system can control multiple unmanned airplane transfer systems. The central control system can optimize the taxi-in and taxi-out process of multiple airplanes.

The airplane transfer system is computer controlled and commanded from a central control system. The central control system can track the locations of multiple airplane transfer systems and provide visual indications to an operator. This visual and detailed presentation of the taxi-in and taxi-out process will replace the prior art vocal based method of controlling the taxi-in and taxi-out process.

Conveniently, the transfer process is fully controlled by the pilot of the airplane, and the unmanned airplane transfer system can transfer the airplane in a similar manner that the airplane was transferred at the absence of the system.

Conveniently, the pilot can use a combination of steering operations in order to send commands to the unmanned airplane transfer system.

According to another embodiment of the invention the taxi-in and taxi-out process can be fully automated and requires no pilot intervention. The fully automation includes controlling one or more unmanned airplane transfer systems by a central control system that wirelessly communicates with the multiple unmanned airplane transfer systems.

The central control system can increase the safety of traffic on the ground, of manned and unmanned vehicles that are positioned in the airport, and the like. The central control system can prevent conflicts among moving entities on airport grounds: pedestrian, manned vehicles, robotic vehicles and aircraft. The central control system can also control obstacle detection and avoidance operations, traffic control coordination with aircraft, other vehicles and personnel, etc.

According to another embodiment of the invention an unmanned airplane transfer system and/or the central control system can have collision avoidance capabilities. The central control system can prevent collisions by monitoring the distance between adjacent airplanes and keeping a certain predefined distance between airplanes. The unmanned airplane transfer system can prevent collisions by sensing the distance of the airplane from other objects. If an object is too close the unmanned airplane transfer system can provide an audio/visual indication and/or can alter the transfer of the airplane accordingly.

Conveniently, the unmanned airplane transfer system supports the nose landing gear. The unmanned airplane transfer system can apply any prior art method for supporting the nose landing gear. For example, it can have a sloped surface one which the one or more wheels of the landing gear can climb.

At least the rotations of the unmanned airplane transfer system are controlled by the regular steering system that is used by the pilot when the airplane moved on the ground without being connected to the unmanned airplane transfer system. In some airplanes the steering system includes a steering wheel as well as break pedals. In other airplanes the steering system includes a pair of pedals are used for controlling the rotation and speed of the airplane.

It is noted that various wheels can be used for steering, for transferring or a combination of both.

Conveniently, once the unmanned airplane transfer system supports the nose landing gear the airplane is transferred on its rear landing gears and the unmanned airplane transfer system. The airplane transferring system can utilize skid steering thus it can rotate along its axis with substantially zero turning radius.

Conveniently, controlling the unmanned airplane transfer system (ATS) in response to movements (real or virtual) of airplane control component does not require to add dedicated control panels or dedicated displays.

Figure 2:
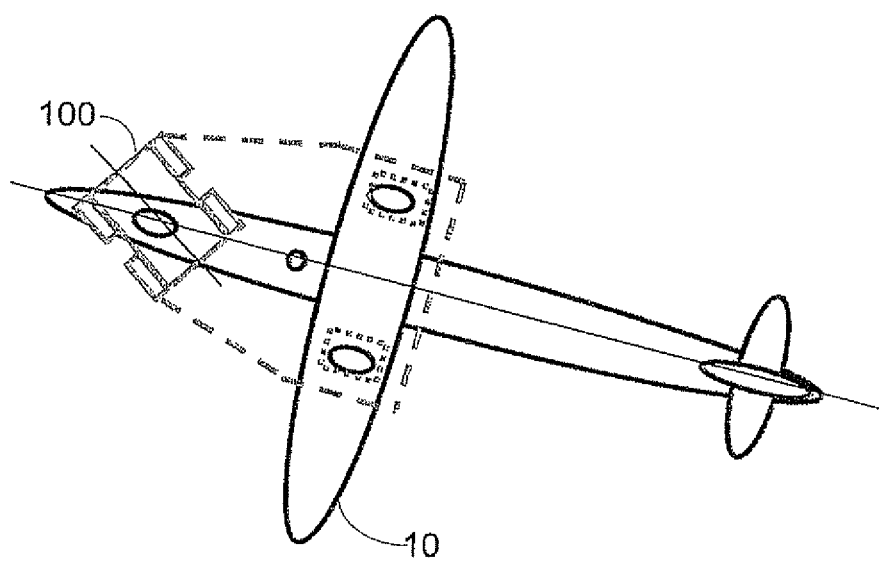

FIGS. 1 and 2 illustrate airplane 10 that is being transferred by unmanned airplane transfer system 100, according to an embodiment of the invention. In FIG. 1 the airplane longitudinal axis is parallel to the longitudinal axis of the unmanned airplane transfer system while in FIG. 2 these two axes are not parallel to each other, as the unmanned airplane transfer system 100 starts to turn to the right.

FIG. 1 illustrates an airplane 10 that includes two rear landing gears 12 and 14 that are positioned below corresponding wings of airplane 10. Unmanned airplane transfer system 100 also includes a nose landing gear 20. The center of gravity 16 of airplane 10 is positioned between the three landing gears 12, 14 and 20.

FIG. 2 illustrates an airplane 10 and an unmanned airplane transfer system 100 in turning mode. The dashed line illustrates a "virtual car" where the airplane rear landing gear wheels are the "vehicle" rear wheels, and the unmanned airplane transfer system 100 is the "vehicle" front wheel, steering, velocity change, breaking and power systems.

Figure 3:
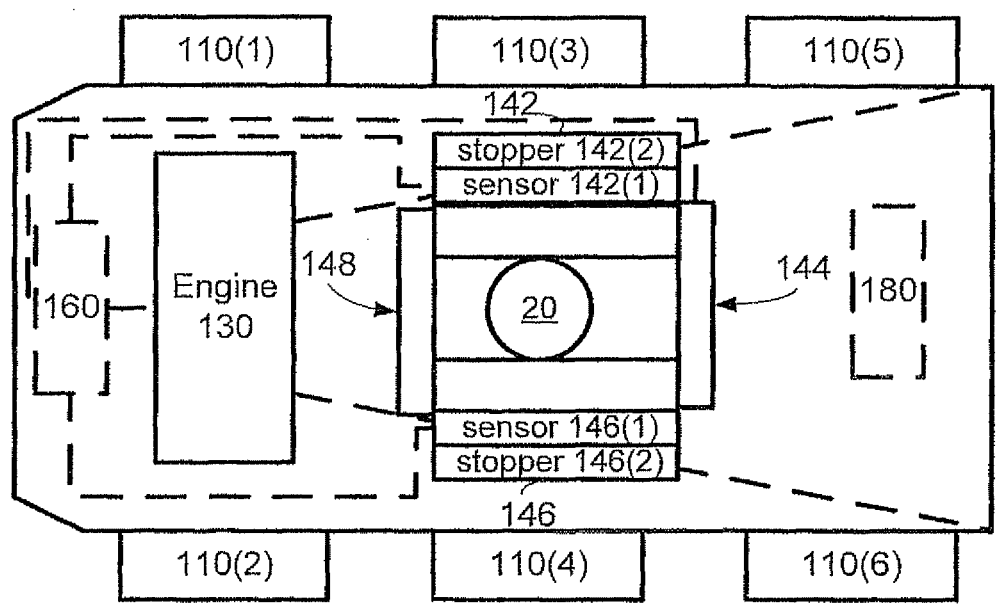
FIG. 3 illustrates an unmanned airplane transfer system, according to an embodiment of the invention.

FIG. 3 illustrates an unmanned airplane transfer system 100 according to an embodiment of the invention.

Unmanned airplane transfer system 100 includes six wheels 110(1)-110(6), engine 130, controller 160, and landing gear sensing and constraining units 142 and 146 and restrainers 144 and 148. The transfer module of unmanned airplane transfer system 100 includes wheels 110(1)-110(6), the engine 130 and any mechanical transmissions used to rotate the wheels in any direction.

The landing gear sensing and constraining units 142 and 146 include sensors 142(1) and 146(1) that can sense rotational mechanical movements of the landing gear and also include restrainers 142-148 that prevent the landing gear 20 form moving beyond relatively slight movements.

These mechanical movements at least partially occur in response to steering commands from a pilot. Thus, if the pilot wants to turn the airplane to the right he can rotate the steering wheel to the right and the landing gear will rotate slightly to the right. Sensors 142(1)-146(1) will sense this slight movement and indicate to controller 160 that the airplane should be turned to the right. Conveniently, changes in the velocity of the airplane are controlled by the pilot.

According to another embodiment of the invention system 100 also includes sensors for sensing change in the velocity of the airplane so that when the pilot hits the breaks at least the breaks of rear landing gear 12 and 14 operate to slow down the airplane. This slowing down can be sensed by an accelerometer or can be sensed by a sensor (not shown) that is positioned between the nose landing gear and the rear landing gears.

It is noted that unique combination of steering commands (for example sequences of rotations and/or pressing breaks) can represent transfer commands. For example a first steering command can indicate the need to speed up the towing process. The speeding up can continue for a predefined period or until another command is sensed by system 100. For example, if the pilot realizes that system 100 is about to cross a landing runway he can issue a speed up command (by performing a unique sequence of steering commands) to system 100 and in turn system 100 can speed up the transfer process.

It is noted that unmanned airplane transfer system 100 can use various prior art multi-direction steering technique and can include various types of wheels including fixed standard wheel, steered standard wheel, castor wheel, Stanford (Swedish) wheel and the like, smart wheel (developed by the Center for Self-Organizing and Intelligent systems at the Utah State University), and the like. It is further noted that the unmanned airplane transfer system 100 can also include one or more caterpillar tracks or a combination of one or more caterpillar tracks and one or more wheels. A combination of wheels and caterpillar tracks is illustrated in U.S. patent application publication serial number 2006/0056949 of Eckert which is incorporated herein by reference.

Conveniently, at least two wheels out of wheels 110(1)-110(6) can rotate independently from each other. According to another embodiment of the invention the rotation speed of one wheel can differ from a rotation speed of another wheel. Skid steering, for example, involves rotating wheels on one side of the unmanned airplane transfer system 100 at a speed that differs from the speed of the wheels at another side of the unmanned airplane transfer system 100.

It is further noted that the number of wheels can differ from six. For example, unmanned airplane transfer system 100 can include four wheels. The number of wheels is usually responsive to the weight of the airplane to be towed.

Conveniently, when the airplane is towed in a straight line, the transfer module rotates wheels 110(1)-110(6) at a constant rate. Accordingly, the airplane is constantly pulled (towed) in a manner that resembles the slow and continuous movement of the airplane 10 when it is transferred by its idling jet engines.

It is further noted that although FIG. 1 illustrates a single motor 130 but this is not necessarily so. A motor can be allocated per wheel or per group of wheels. The motor (or motors) can be connected to the wheels in various manners. For example, the unmanned airplane transfer system can include at least one of the following: (i) diesel engine for providing hydraulic power that drives a hydraulic motor on the wheels via a valve assembly; (ii) diesel engine powering an electrical generator and a battery that drives electrical motors that rotate the wheels; (iii) a diesel engine that both powers an hydraulic pump and also powers an electric generator such as to drive a combination of hydraulic motors and electrical motors; (iv) an electrical motor adapted to receive electrical power from rails places on the surface of the airport; (v) fuel cells that drive electrical motors.

Conveniently, unmanned airplane transfer system 100 includes navigation unit 180 that enables unmanned airplane transfer system 100 to navigate at an airport. This navigation capability can be useful after unmanned airplane transfer system 100 finishes to taxi-out an airplane. Then it can navigate itself to another airplane or to waiting point from which it will navigate itself towards the next airplane to be towed. Navigation unit 180 can be connected to controller 160 or can be a part of controller 160. It should include at least one location sensor as well as a storage unit that stores information representative of the airport.

Navigation unit 180 allows to navigate the airplane transfer system in a fully automatic manner, in a semi-automatic manner (allows remote control when an unexpected event such as a presence of a obstacle occurs) or a fully remotely controlled manner. The remote control can be applied by a controller of a central control unit.

It is noted that the airplane can place its landing gear on unmanned airplane transfer system by placing the unmanned airplane transfer system at a certain location and while the unmanned airplane transfer system is still, the pilot navigates the nose landing gear on the unmanned airplane transfer system.

Figure 4:
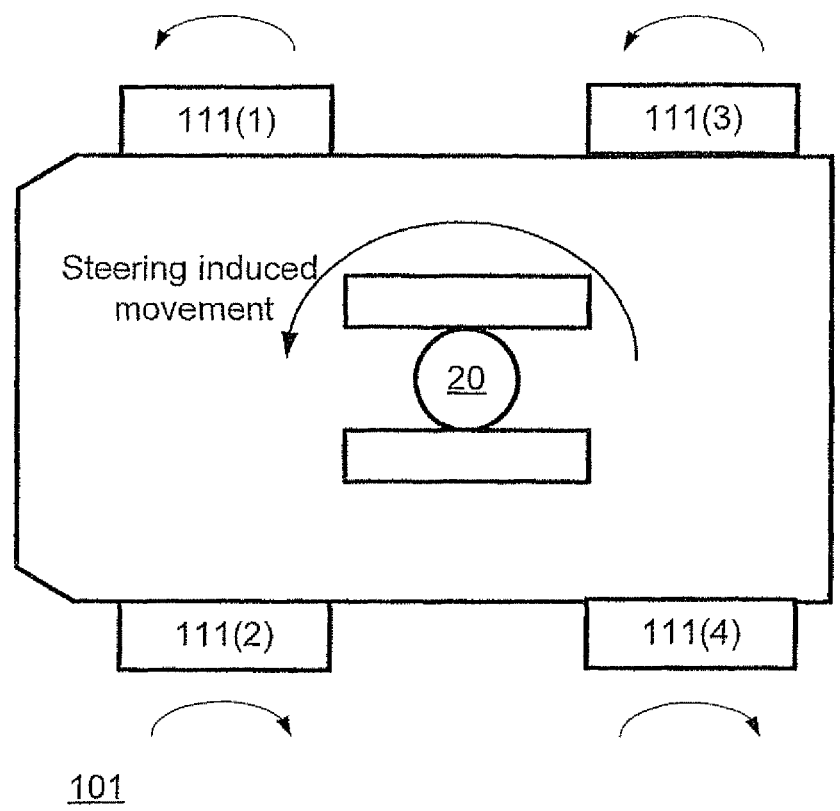
FIG. 4 illustrates an unmanned airplane transfer system, according to an embodiment of the invention.

FIG. 4 illustrates a rotation of a four-wheeled unmanned airplane transfer system 101 about its axis by rotating different wheels 111(1)-111(4) in different directions, while the wheels are parallel to each other. The pilot requests to turn the plane to the left (counterclockwise) and in response the left side wheels 111(2) and 111(4) are rotated clockwise while the right side wheels 111(1) and 111(3) are rotated counterclockwise.

It is noted that each sensor out of sensors 142(1)-148(1) can track the movements of a spring that is connected to a plate that interfaces with the landing gear. The springs, or alike, can be connected on their other side to a frame. The frame and at least one plate and spring can be elevated or lowered down when the landing gear climbs on the unmanned airplane transfer system.

Figure 5:
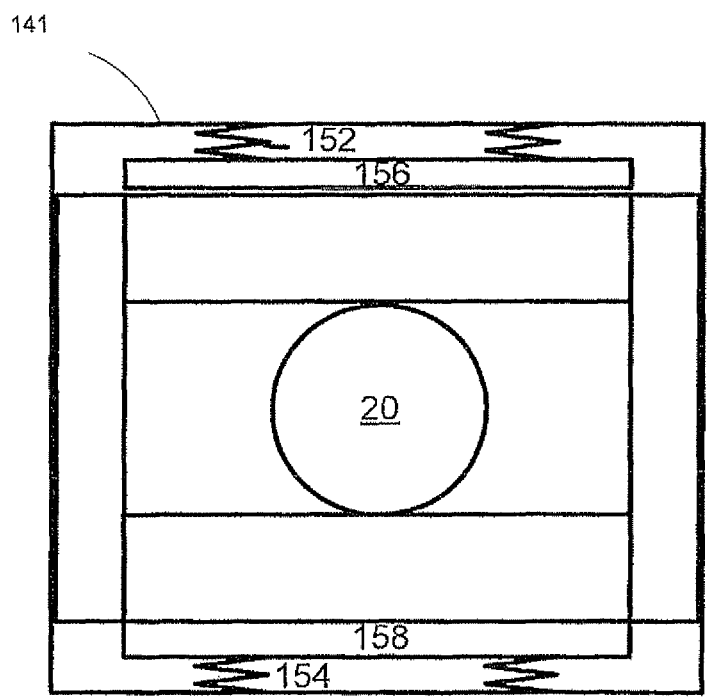
FIG. 5 illustrates a lower portion of a landing gear and multiple springs and plates.

FIG. 5 illustrates a lower portion of a landing gear 20 and multiple springs and plates, according to an embodiment of the invention.

Rigid frame 141 surrounds the springs and plates and prevents the landing gear 20 from moving beyond predetermined movements. Frame 141 can be lifted or raised during the placement of the landing gear on unmanned airplane transfer system 100. Frame 141 can also include detachable frame elements that can be moved towards each other when the unmanned airplane transfer system 100 tows airplane 10.

Figure 6:
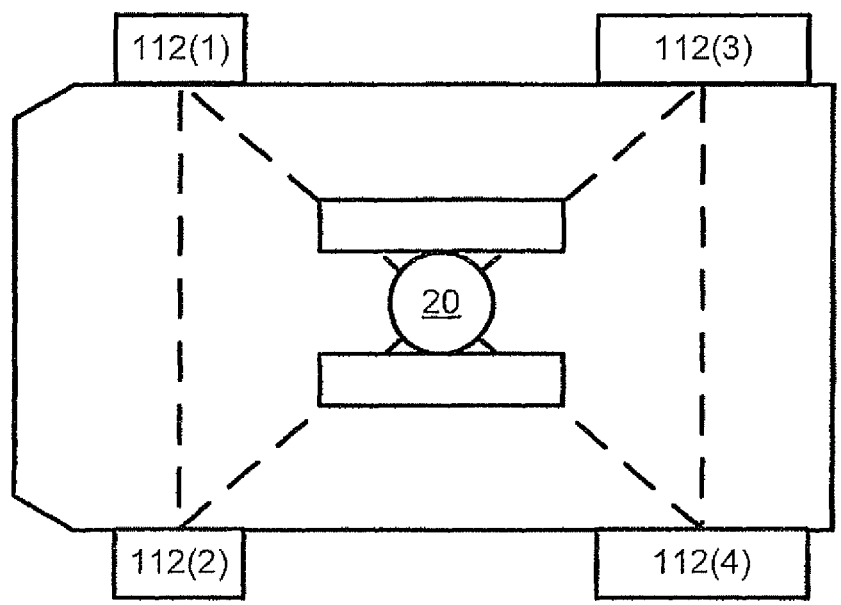
FIGS. 6-9 illustrate unmanned airplane transfer systems, according to various embodiments of the invention.

Sensors track the movement of springs, or alike (such as springs 152 and 154) that are connected to plates (such as plates 156 and 158) that interface with the landing gear. Landing gear 20 is illustrated as including two wheels but the number of wheels supported by unmanned airplane transfer system can differ than two. If, for example the pilot wishes to turn to the right the landing gear 20 will slightly rotate clockwise and at least some springs out of springs 152-154, or alike, will move accordingly. FIG. 6 illustrates unmanned airplane transfer system 102, according to an embodiment of the invention.

Unmanned airplane transfer system 102 includes four wheels 112(0)-112(4). Rear wheels 112(3) and 112(4) define an imaginary rear axis while front wheels 112(1) and 112(2) define an imaginary front axis. Landing gear 20 is positioned at the geometrical center of unmanned airplane transfer system 102, as defined by the front and rear axes and by an imaginary longitudinal symmetry axis that is parallel to the wheels.

Figure 7:
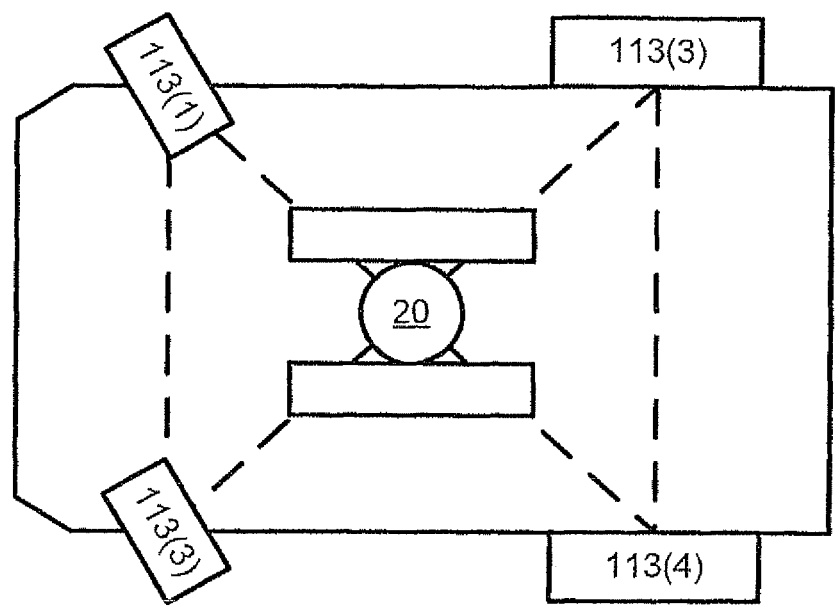

FIG. 7 illustrates unmanned airplane transfer system 103, according to an embodiment of the invention.

Unmanned airplane transfer system 102 includes four wheels 113(1)-113(4). Rear wheels 113(3) and 113(4) are positioned in line with the wheels of landing gear 20. Front wheels 113(1) and 113(2) are castor wheels that can rotate along their axes. The front wheels can be used for steering while the rear wheels are used for towing, but this is not necessarily so.

Figure 8:
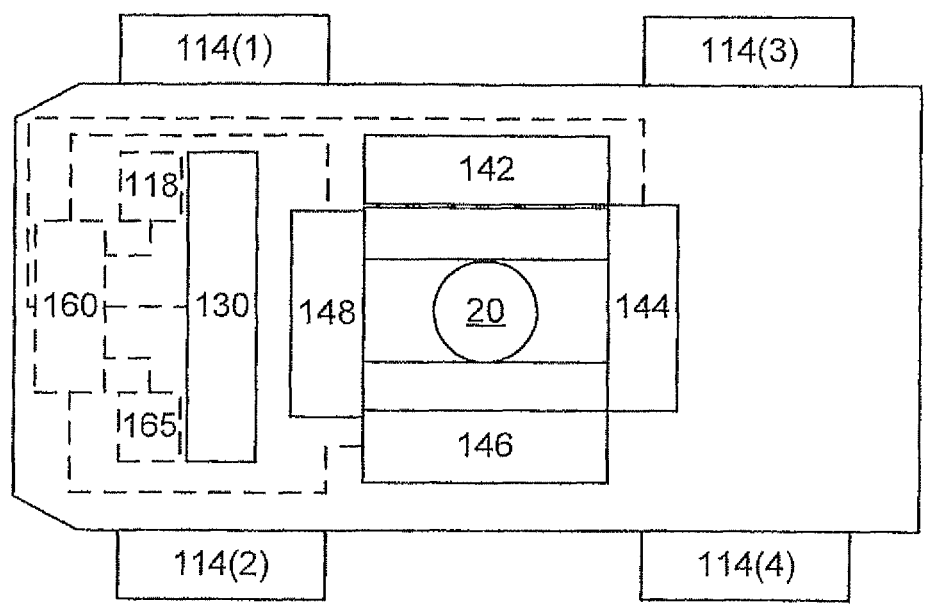

FIG. 8 illustrates unmanned airplane transfer system 104, according to an embodiment of the invention.

Unmanned airplane transfer system 104 includes four wheels 114(1)-114(4), controller 160 and transceiver 165. The transceiver 165 is adapted to receive commands over a wireless medium. These commands are sent to controller 160 that in turn can control unmanned airplane transfer system 104 in response to these commands. It is noted that unmanned airplane transfer system 104 can operate in multiple modes-pilot controlled mode, remote control mode and a hybrid mode in which various commands can be provided in a remote manner while other commands are sensed by at least one landing gear sensing and constraining unit, and also manual (local) driving by and operator.

It is noted that the unmanned airplane transfer system can also controlled by a short-range remote control transmissions, by using a lap top computer and the like.

Conveniently, unmanned airplane transfer system 104 included optional position sensors such as but not limited to GPS based sensors that enable to determine the location of the system. The location of system 104 can affect the movements of the system. For example, if the system is about to cross a landing runway then system 104 can speed up the transfer process. The speeding up can include increasing the speed to a predefined speed and lowering the speed once the airplane passes the landing runway. The locations of the landing runways can be previously provided to system 104. According to another embodiment of the invention the velocity is only controlled by the pilot.

Conveniently, unmanned airplane transfer system 104 includes optional obstacle unit 118 adapted to detect and/or avoid obstacles.

Obstacle unit 118 can include one or more obstacle sensors such as a laser scanner, a radar, a camera, an acoustic sensor or a combination thereof. The obstacle sensor can scan the area in front of airplane 100 or especially in front of unmanned airplane transfer system 104 in order to detect obstacles. If an obstacle is detected the unmanned airplane transfer system 104 is stopped by the pilot, or it can alter the path of the towed airplane, provide an audio/visual indication (including activating a siren), sending an indication to a central control system and the like.

According to an embodiment of the invention once an obstacle is detected a central control system is informed and the airplane transfer system can acknowledge a change of path or request the pilot to select whether to change the path. The path change can be controlled by the pilot, by the central control system and optionally by the airplane transfer system.

Figure 9:
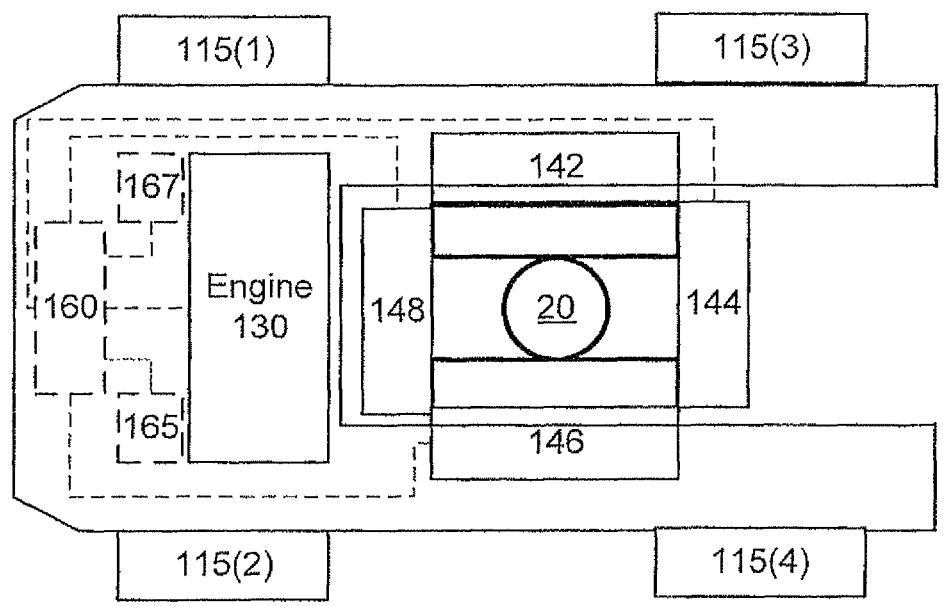

FIG. 9 illustrates unmanned airplane transfer system 105, according to various embodiments of the invention.

Unmanned airplane transfer system 105 includes four wheels 115(1)-115(4), controller 160, transceiver 165 and a manual control interface 167. Manual control interface 167 can allow an operator to manually operate unmanned airplane transfer system 105. It can include a steering wheel, a pedal and the like.

It is noted that an unmanned airplane transfer system can include both a transceiver and a manual control interface and that such a system can operate in multiple different operational modes.

Figure 10:
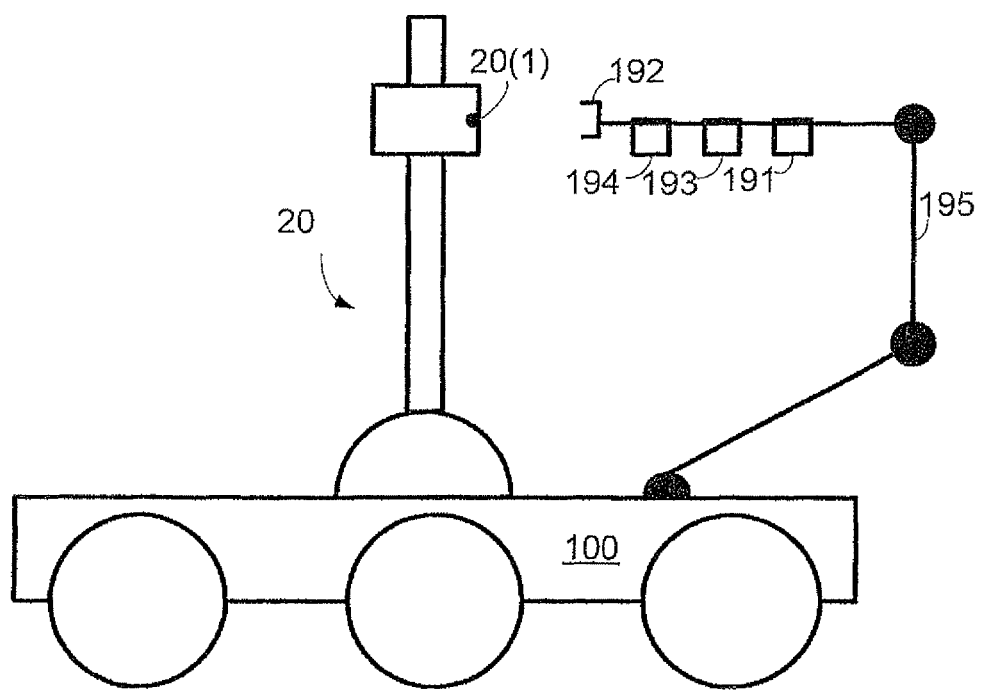
FIG. 10 illustrates a landing gear and an unmanned airplane transfer system, according to various embodiments of the invention.

FIG. 10 illustrates unmanned airplane transfer system 100 and a landing gear 20 according to an embodiment of the invention.

Unmanned airplane transfer system 100 is adapted to receive modulated signals representative of steering commands over an audio connection. These modulated signals are generated in response to pilot steering efforts as well as pilot control of the velocity of the airplane.

Conveniently, the audio link is used for conveying audio commands from the pilot. Unmanned airplane transfer system 105 can apply voice recognition techniques in order to recognize these audio commands. Once a command is recognized the unmanned airplane transfer system can operate according to the command.

It is noted that the reception of audio commands or of the modulated signals representative of steering commands can replace the sensing of mechanical movements but can also be applied in addition to the sensing of the mechanical movements of the landing gear.

According to yet another embodiment of the invention the connection to the audio plug can be done by an operator.

Typically such audio output interfaces are found in airplanes that were towed by manned towing vehicles.

It is noted that the connection to the audio output interface can be done automatically by using a camera and applying image recognition to guide an interface of the unmanned airplane transfer system towards the audio output interface of the landing gear.

FIG. 10 illustrates camera 191, gripper 192, sliding audio plug 193, and sliding audio cover lifter 194 that are connected to a movable arm 195. Movable arm can lift the camera 191 to the height of the audio output interface 21 of landing gear 20, use enable sliding gripper 194 to hold landing gear 20, allow the sliding audio cover lifter to lift a cover that protects audio output interface 21 and then enable the sliding audio plug 193 to connect to audio output interface 21.

Conveniently, movable arm 195 can be used to remove the nose landing gear wheel safety pin, in accordance to the transferring system mode of operation and according to the towing phase.

Figure 11:
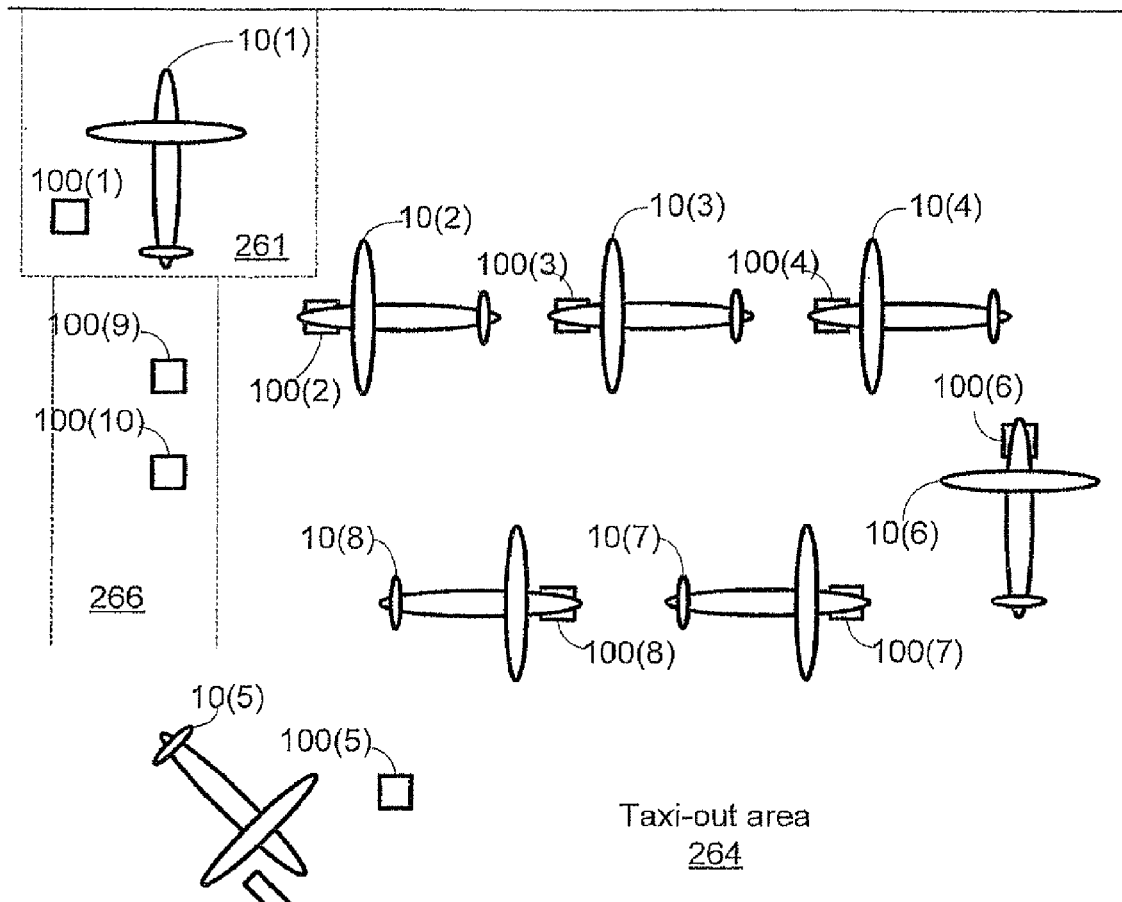
FIGS. 11 and 12 illustrate multiple airplanes and multiple unmanned airplane transfer systems within an airport, according to an embodiment of the invention.

FIG. 11 illustrates multiple airplanes 10(1)-10(8) and multiple unmanned airplanes transfer systems 100(1)-100(10) according to an embodiment of the invention.

The multiple airplanes 10(1)-10(11) and multiple airplanes transfer systems 100(1)-100(10) are located at airport 200.

Airport 200 includes terminal 210, take-off runway 262, check up area 261, unmanned airplane transfer system path 266 and taxi-out area 264.

Conveniently, a last minute check is performed at check-up area 261, by an operator that checks the airplane for leaks, can extinguish fire, can remove the safety pin that allows the landing gear to be rotated and the like. The airplane can ignite their jet engines at check up area 261 or before reaching that area. For Example, airplanes 10(2), 10(3) and even 10(4) can ignite their engines. An unmanned airplane transfer system can detach from the airplane before reaching check-up area 261.

Figure 12:
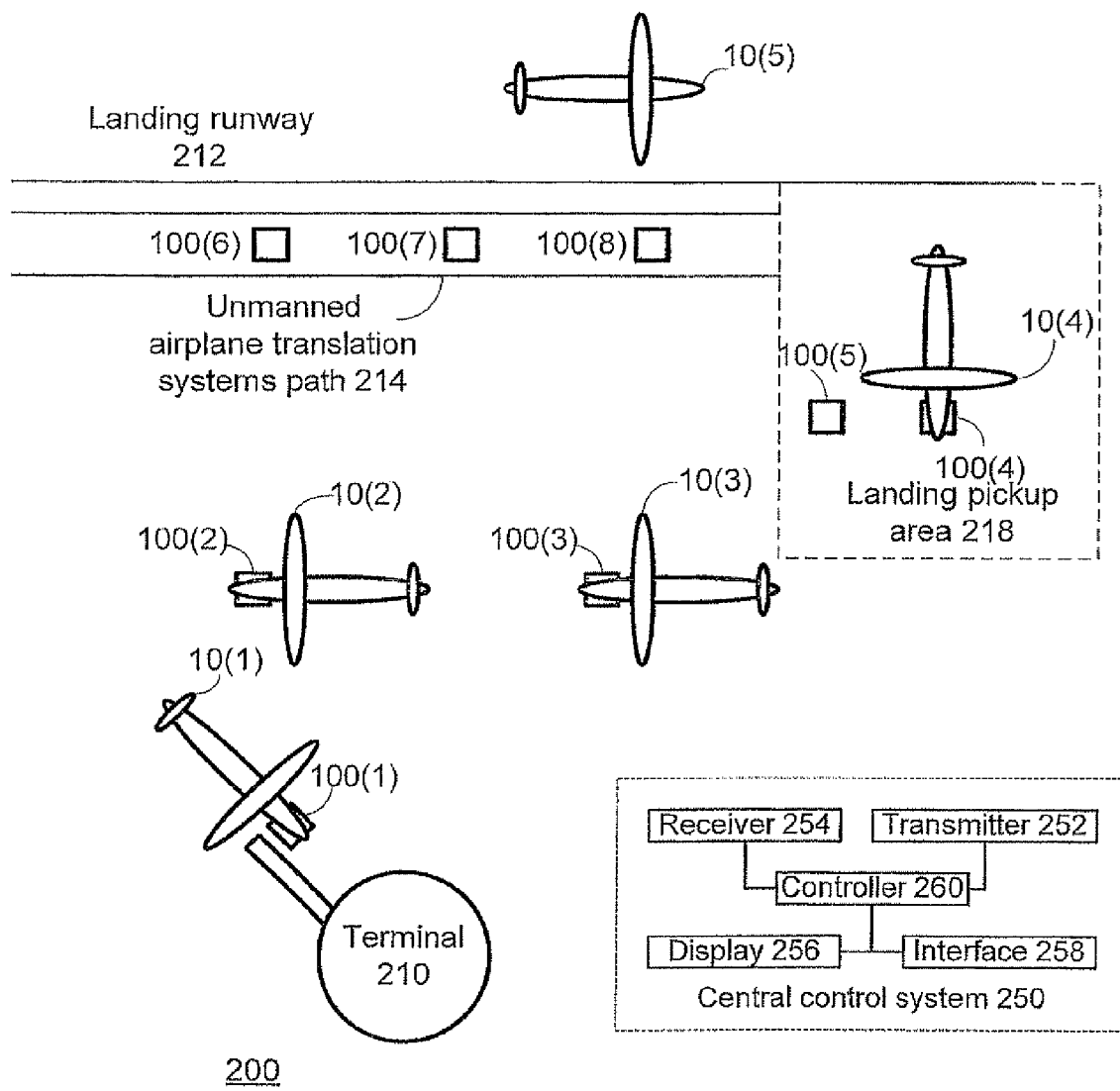

In addition, FIG. 12 illustrates a central control system 250 that is capable of communicating with airplanes transfer systems 100(1)-100(10) and controlling their movements.

Airplane 10(1) is positioned at engine start and check up area 216 after being disconnected form the unmanned airplane transfer system that towed it from terminal 210. Unmanned airplane transfer systems such as systems 100(9), 100(10) and 100(1) that completed their task return to terminal 210, via unmanned airplane transfer system path 266.

Airplanes 10(2)-10(8) are being towed, at taxi-out area 268, by unmanned airplane transfer systems 100(2)-100(8). Airplane 10(5) waits at terminal 210 to be towed by an unmanned airplane transfer system.

Conveniently, the airplane stops before the unmanned airplane transfer system detaches from it. After the towing ends the unmanned airplane transfer system can navigate towards the terminal. The navigation as well as the towing can be at least partially controlled by central control system 250, but this is not necessarily so.

According to an embodiment of the invention the central control system 250 is a $C^4$ command and control system. It is operated by the Airport Taxi Supervisor/Ground Traffic Controller operator. Central control system 250 can control multiple airport transfer systems. It can override manually controlled unmanned airplane transfer systems, can override steering mechanism based upon sensing airplanes movements and the like. It can optimize the movements of unmanned airplane transfer systems, either during towing operation or during transfer between positions without airplanes. Central control system 250 can be integrated with the airport air traffic control system.

The central control system 250 can track the location of the various airplane transfer systems (by receiving location information from the airplane transfer systems, from the planes, from other location sensors), and displays to a controller the location of the various airplanes, airplane transfer system and thus greatly reduced human errors in the taxi-in and taxi-out process. Conveniently the central control system also received location information (either directly or via another control system) of various vehicles that are present in the airport and especially near runways and in the taxi-in and taxi-out areas and can provide to the controller an overall visual representation of the airport and the various entities in the airport. The central control system 250 can prevent aircraft taxi accidents, vehicle-aircraft accidents. It can prevent pilot or traffic controller errors and misunderstandings towards take-off, and the like.

Central control system 250 includes: (i) At least one transmitter (such as transmitter 252) adapted to transmit steering commands to multiple unmanned airplane transfer vehicles. (ii) At least one receiver (such as receiver 254) adapted to receive location information from the multiple unmanned airplane transfer vehicles. (iii) At least one display (such as display 256) for displaying locations of multiple airplanes and the multiple unmanned airplane transfer vehicles. (iv) At least one interface (such as interface 258) adapted to receive from an operator operational mode commands adapted to determine a control mode of at least one unmanned air plane transfer system. The interface can include keyboard, mouse, and the like that are connected to a computer that in turn controls display 256.

Conveniently, central control system 250 is adapted to receive an obstacle indication from an unmanned airplane transfer system and to selectively acknowledge a change in a path of the unmanned airplane transfer system.

Conveniently, central control system 250 is adapted to receive an obstacle indication from an unmanned airplane transfer system and to control a change of path of the unmanned airplane transfer system.

Conveniently, central control system 250 is adapted to receive a failure indication from an unmanned airplane transfer system and to selectively acknowledge a detachment of the unmanned airplane transfer system from the airplane.

Conveniently, central control system 250 is adapted to receive a failure indication from an unmanned airplane transfer system and to control a transfer of an airplane by the unmanned airplane transfer system.

Conveniently, central control system 250 is adapted to optimize a distance between multiple airplanes being towed by multiple unmanned transfer systems.

Conveniently, central control system 250 can control an unmanned airplane transfer system in a first operational mode in which central control system sends 250 steering commands that override steering commands that are mechanically sensed by the unmanned airplane transfer system.

FIG. 12 illustrates multiple airplanes 10(1)-10(5) and multiple airplanes transfer systems 100(1)-100(8) according to an embodiment of the invention.

The multiple airplanes 10(1)-10(5) and multiple airplanes transfer systems 100(1)-100(8) are located at airport 200.

Airport 200 includes terminal 210, landing runway 212, landing pickup area 218 and unmanned airplane transfer system path 214. A central control system 250 is also located in airport 200. Airplane 10(5) is landing on landing runway 212. Airplane 10(4) has previously landed and is approached by unmanned airplane transfer system 100(5). Airplane 10(3) is towed by unmanned airplane transfer system 100(3) towards terminal 210. Airplane 10(2) is towed by unmanned airplane transfer system 100(2) towards terminal 210. Airplane 10(1) was towed by unmanned airplane transfer system 100(1) and is hooked to terminal 210 at the gate.

Unmanned airplane transfer systems 100(6)-100(8) propagate through unmanned airplane transfer system path 214, towards landing pickup area 218. Unmanned airplane transfer system 100(4) waits, at landing pickup area 218, to airplane 10(4).

Conveniently, the airplane stops before being towed, to enable the unmanned airplane transfer system to support its landing gear. After the towing ends at the engine start and check up area, the unmanned airplane transfer system can navigate towards the landing pickup area 218. This navigation can be controlled by a central control system, but this is not necessarily so.

Figure 13:
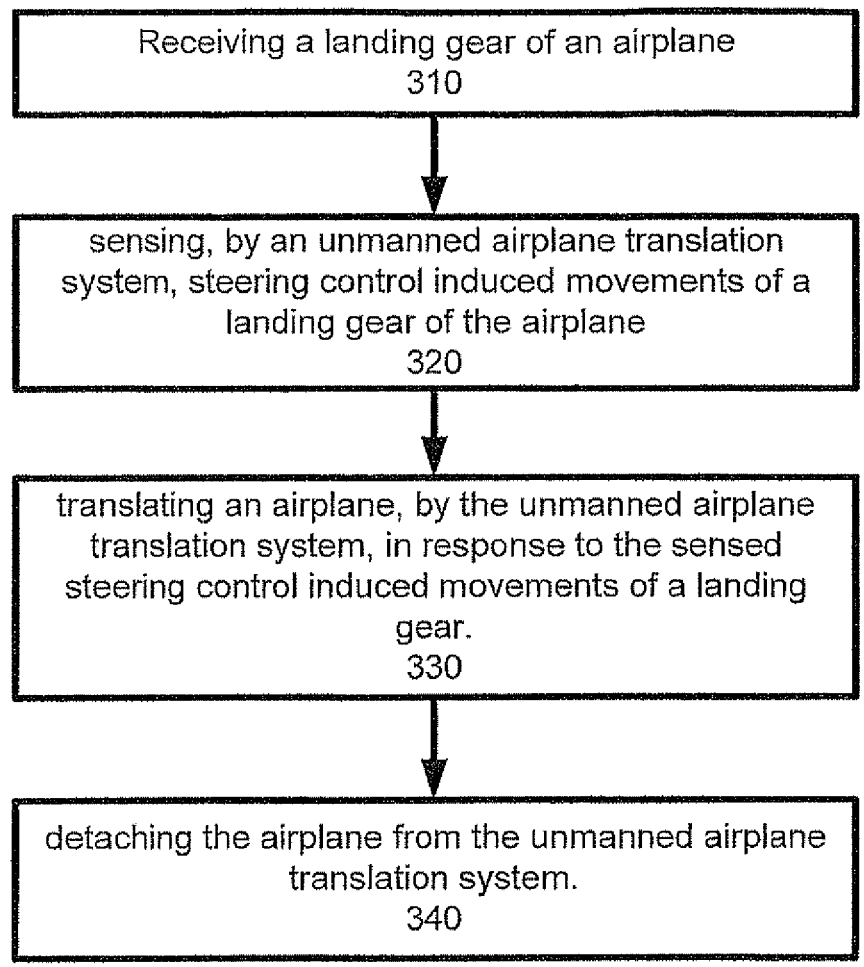
FIG. 13 is a flow chart of a method for transferring an airplane, according to an embodiment of the invention.

FIG. 13 illustrates method 300 for transferring an airplane, according to an embodiment of the invention.

Method 300 starts by stage 310 of receiving a landing gear by an unmanned airplane transfer system.

Stage 310 is followed by stage 320 of sensing, by an unmanned airplane transfer system, steering control induced movements of a landing gear of the airplane. Referring to the example set fourth in FIGS. 3 and 5 multiple sensors sense rotational mechanical movements of the mechanical gear such as rotation, de-acceleration and the like.

Stage 320 is followed by stage 330 of transferring an airplane, by the unmanned airplane transfer system, in response to the sensed steering control induced movements of a landing gear. Referring to the examples set fourth in FIGS. 1-4 and 9, the airplane is towed by an unmanned airplane towing system in response to the sensed movements.

Stage 330 is followed by stage 340 of detaching the airplane from the unmanned airplane transfer system. Referring to the example set fourth in FIGS. 11 and 12, once the taxi-in or taxi-out is completed the unmanned airplane transfer system can detach.

Conveniently, stage 320 of sensing includes sensing pilot commands to determine the airplane velocity whereas the transferring is responsive to the velocity change commands.

Conveniently, stage 330 of transferring is further responsive to remotely transmitted commands. Referring to the examples set fourth in FIGS. 8,9 and 12 the unmanned airplane transfer system can include a transceiver for receiving commands and it can be remotely controlled by a central control system, although this is not necessarily so.

Conveniently, stage 330 of transferring includes independently controlling at least two independently controlled wheels. Referring to the example set fourth in FIGS. 7 and 4, different wheels can rotate at different speeds, at different directions and can also be placed in positioned that are not parallel to each other.

Conveniently, method 300 also includes receiving audio commands or modulated signals representative of steering commands and wherein the transferring is responsive to the received audio commands. Referring to the example set fourth in FIG. 10, the unmanned airplane transfer system can receive audio commands from the landing gear, recognize the commands and act accordingly.

Conveniently, method 300 also includes determining a location of the airplane and wherein the transferring is responsive to the sensed location.

Conveniently, method 300 further includes detecting an unmanned airplane transfer system failure and in response detaching the airplane from the unmanned airplane transfer system.

It is noted that once a failure is detected the unmanned airplane transfer system can allow the central control system to take control. The central control system can select to detach the airplane transfer system, but this is not necessarily so. It is further noted that the detachment can be responsive to the type of failures. For example, failures that prevent the unmanned airplane transfer system to be controlled by the central control system may require a detachment without the interference of the control system. Yet according to another embodiment of the invention the pilot can try to control the unmanned airplane transfer system, for example, by sending audio commands.

Conveniently, method 300 includes detecting an obstacle and stage 330 of transferring is responsive to a detected obstacle.

Conveniently, method 300 includes receiving commands from an operator and stage 330 of transferring is responsive to the received commands.

Figure 14:
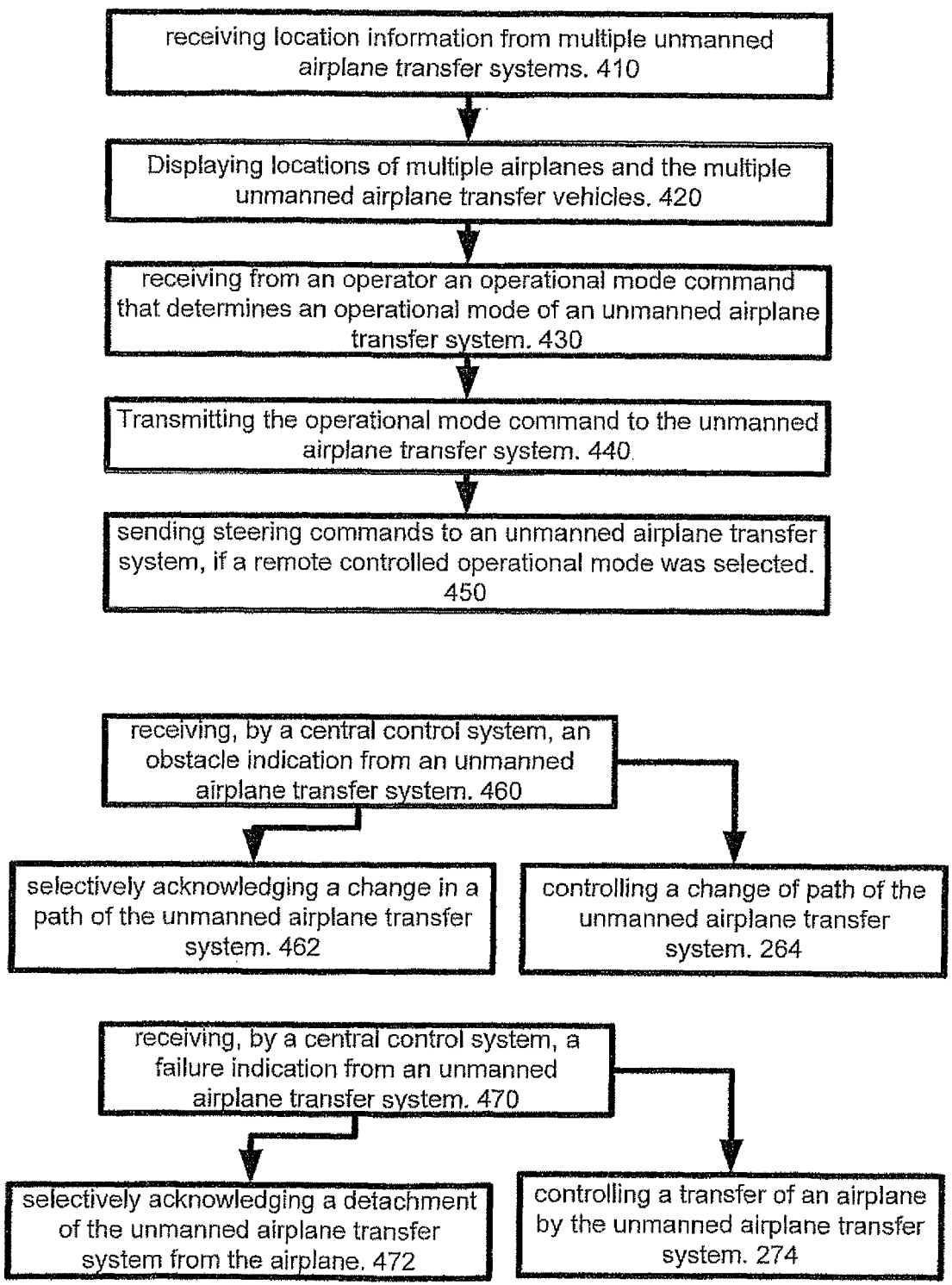
FIG. 14 illustrates a method for controlling multiple unmanned airplane transfer systems, according to an embodiment of the invention.

FIG. 14 illustrates method 400 for controlling multiple unmanned airplane transfer systems, according to an embodiment of the invention.

Method 400 starts by stage 410 of receiving location information from multiple unmanned airplane transfer systems. Stages 410 is followed by stage 420 of displaying locations of multiple airplanes and the multiple unmanned airplane transfer vehicles.

Stage 420 is followed by stage 430 of receiving from an operator an operational mode command that determines an operational mode of an unmanned airplane transfer system.

Stage 430 is followed by stage 440 of transmitting the operational mode command to the unmanned airplane transfer system.

Stage 440 is followed by stage 450 of sending steering commands to an unmanned airplane transfer system, if a remote controlled operational mode was selected. The selection can be made by a central control system operator. Stage 450 includes sending steering commands that override steering commands that are mechanically sensed by the unmanned airplane transfer system.

Method 400 can also include stage 460 of receiving, by a central control system, an obstacle indication from an unmanned airplane transfer system, Stage 460 can be followed by stage 462 of selectively acknowledging a change in a path of the unmanned airplane transfer system. Stage 460 can. Alternatively or additionally, followed by stage 464 of controlling a change of path of the unmanned airplane transfer system.

Method 400 can also include stage 470 of receiving, by a central control system, a failure indication from an unmanned airplane transfer system. Stage 470 can be followed by stage 472 of selectively acknowledging a detachment of the unmanned airplane transfer system from the airplane. Stage 470 can also be followed by stage 474 of controlling a transfer of an airplane by the unmanned airplane transfer system.

Method 400 can also include stage 480 of optimizing a distance between multiple airplanes being towed by multiple unmanned transfer systems. This optimization can include positioning the airplanes close to each other but at a distance that will not dramatically increase the probability of collisions between airplanes.

Figure 15:
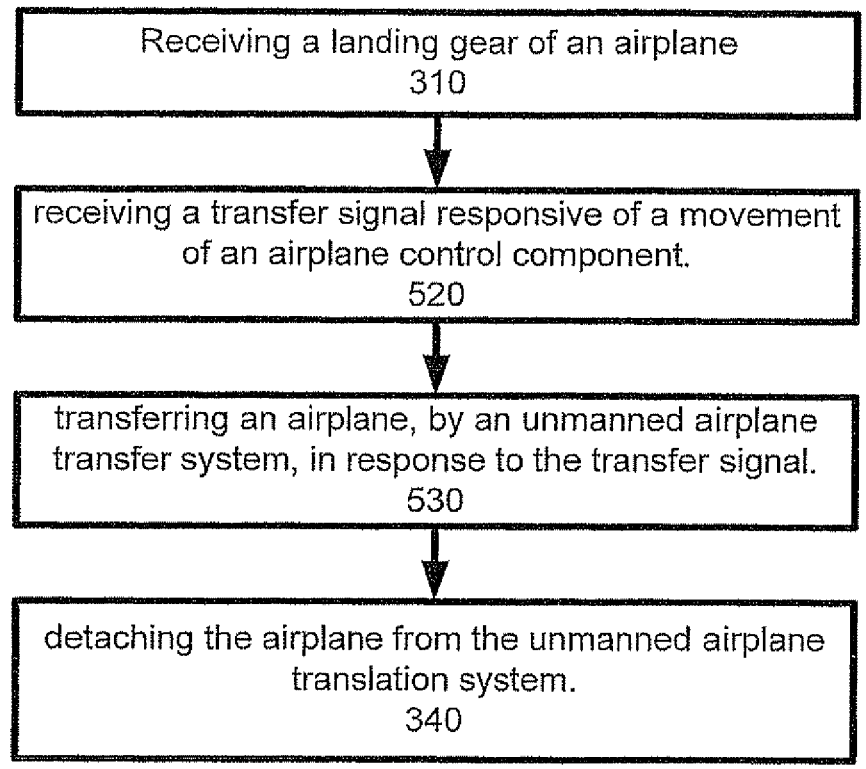
FIG. 15 illustrates a method for transferring an airplane according to an embodiment of the invention.

FIG. 15 illustrates method 500 for transferring an airplane, according to an embodiment of the invention.

Method 500 starts by stage 310 of receiving a landing gear by an unmanned airplane transfer system.

Stage 310 is followed by stage 520 of receiving a transfer signal responsive of a movement of an airplane control component. Stage 520 can include stage 320 but can include, alternatively or additionally, receiving (over wire or in a wireless manner) a transfer signal from an airplane control component, tracking the movement of an airplane control component and the like.

Stage 520 is followed by stage 530 of transferring an airplane, by an unmanned airplane transfer system, in response to the transfer signal. Stage 530 can include stage 330 but this is not necessarily so.

Stage 530 is followed by stage 340 of detaching the airplane from the unmanned airplane transfer system.

Figure 16:
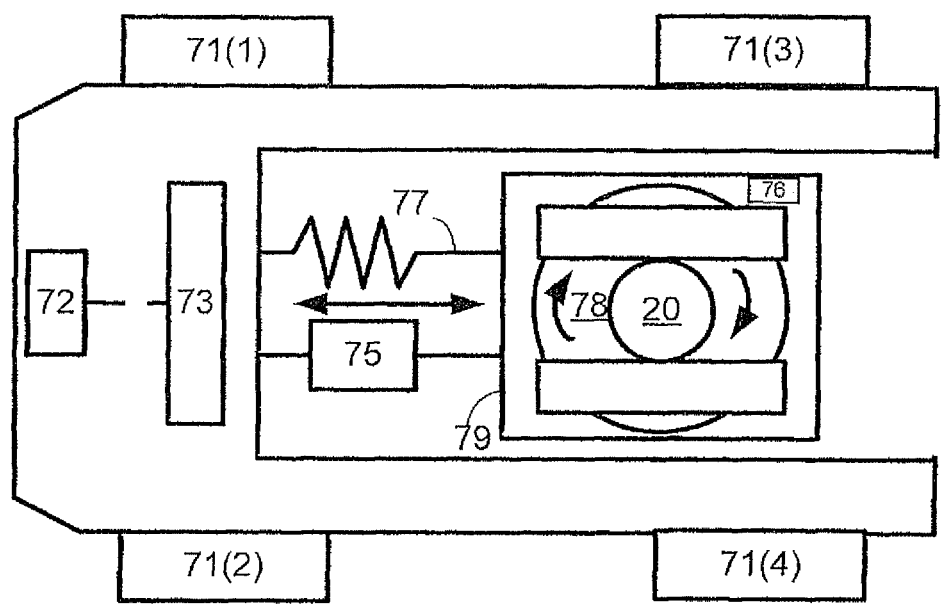
FIGS. 16 and 17 illustrate an unmanned airplane transfer system, according to an embodiment of the invention.
Figure 17:
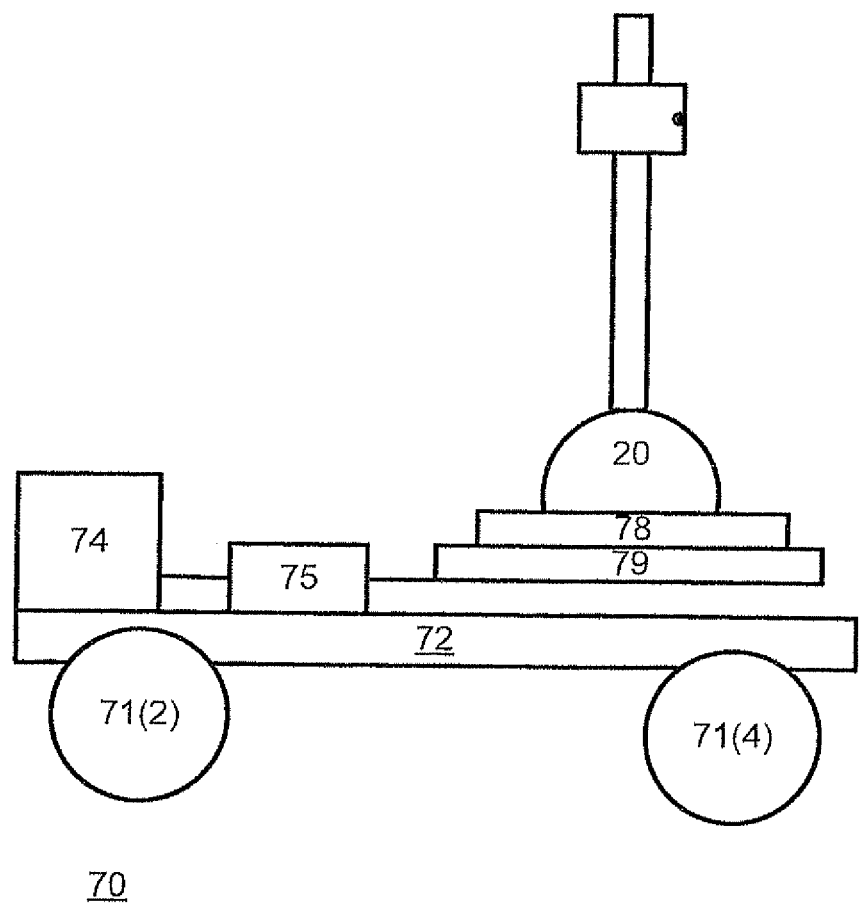
Figure 19:
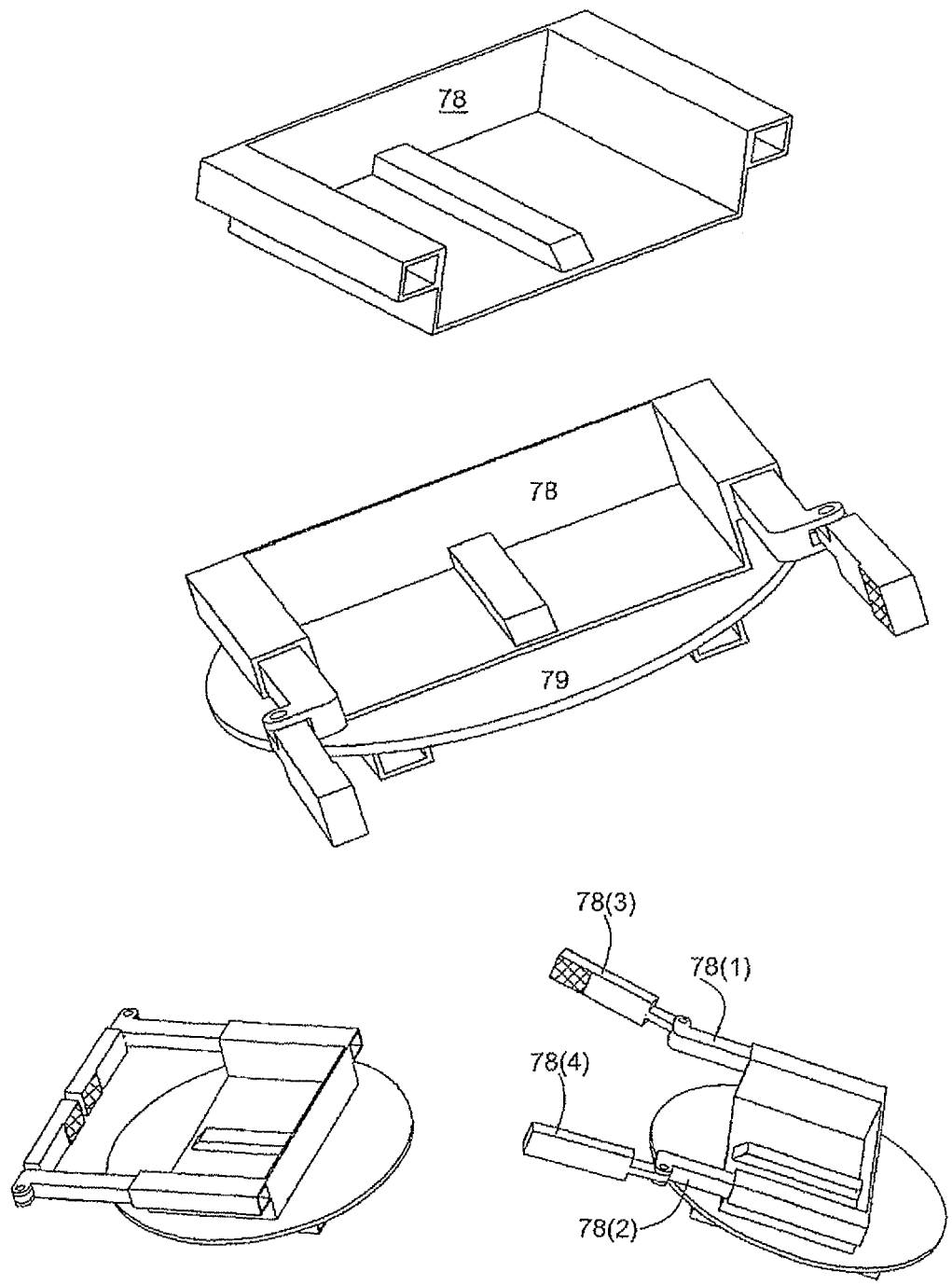
FIG. 19 illustrates a landing gear holder according to an embodiment of the invention.

FIGS. 16 and 17 illustrate an unmanned airplane transfer system, according to an embodiment of the invention. FIG. 19 illustrates a landing gear holder 78.

FIG. 16 is a top view of system 70 while FIG. 17 is a side view of the system.

System 70 includes a transfer module adapted to transfer an airplane. The transfer module may include wheels (such as wheels 71(1)-71(4)), one or more engines (such as engine 73), transmission mechanisms (not shown), controller 72, spring 75, shock absorber 77, landing gear holder 78, as well as one or more structural elements such as structural element 79, and sensor 76. It is noted that a structural element can be a chassis, a plate and the like.

Landing gear holder 78 is adapted to firmly grip landing gear 20 of an airplane. Landing gear holder 78 is pivotally connected (as illustrated by two curved arrows) to a structural element such as structural element 79. Controller 72 is connected to the transfer module and is adapted to control the transfer module in response to a steering induced movement of the landing gear holder.

Sensor 76 is adapted to sense the steering induced movements of the landing gear holder.

Conveniently, landing gear holder 78 is pivotally connected to structural element 79 that in turn is connected to another structural element of system 70, wherein the other structural element may be a part of the transfer module, but this is not necessarily so.

Conveniently, landing gear holder 78 includes a first pair of arms 78(1) and 78(2) that can move forwards or backwards, and well as two rods 78(3) and 78(4) that are pivotally connected to the end of arms 78(1) and 78(2) and rotate such as to virtually and close (or substantially close) a space defined between arms 78(1) and 78(2).

Conveniently, structural element 79 is connected to shock absorber 75 and spring 77 that absorb shocks and also tend to return the structural element to its per-shock condition.

FIG. 18 illustrates method 600 for transferring an airplane according to an embodiment of the invention.

Method 600 starts by stage 610 of receiving a transfer signal responsive of a steering induced movement of landing gear holder. The landing gear holder firmly grips a landing gear of the airplane, and is pivotally connected to a structural element of the unmanned airplane transfer system.

Stage 610 includes sensing the steering induced movement of the landing gear holder. It is noted that the steering induced movement of the landing gear holder is responsive to a steering induced movement of the landing gear. Because the landing gear holder firmly grips the landing gear but is pivotally connected to other parts of the airplane steering system then the landing gear holder can track rotational movements of the landing gear.

Stage 610 is followed by stage 620 of transferring an airplane, by an unmanned airplane transfer system, in response to the transfer signal.

Stage 600 also includes stage 630 dumping energy resulting from a fast change in a velocity of the airplane. This can be useful when the airplane stops, and until the unmanned airplane transfer system also stops.

According to an embodiment of the invention the status of the unmanned airplane transfer system can be reported to the pilot or to a central control system or both. Conveniently, the pilot can receive status indications while the airplane is being transferred to the unmanned airplane transfer system and the central control system can receive status indications when the unmanned airplane transfer system is not attached to the landing gear of the airplane.

For simplicity of explanation FIGS. 20a, 20b, 20c, 21a, 21b, 22, 23, 24, 26 and 27a include one or more unmanned airplane transfer system as unmanned airplane transfer system 100 of FIG. 3. (The same applies to the usage of reference numbers 100(1), 100(2) and 100(3)). It is noted that each of these unmanned airplanes transfer systems can be system 101 of FIG. 4, system 102 of FIG. 6, system 103 of FIG. 7 or system 104 of FIG. 8 and system 105 of FIG. 9.

Figure 20A:
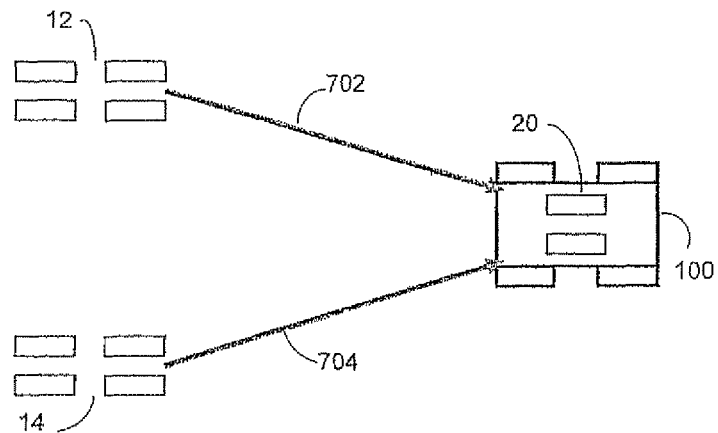
FIGS. 20a, 20b, 20c illustrates multiple unmanned airplane transfer system that tow at least multiple rear landing gears of an airplane, according to an embodiment of the invention.
Figure 20B:
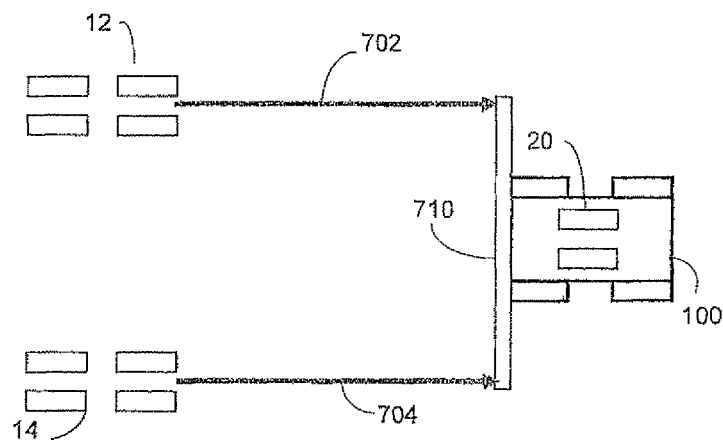
Figure 20C:
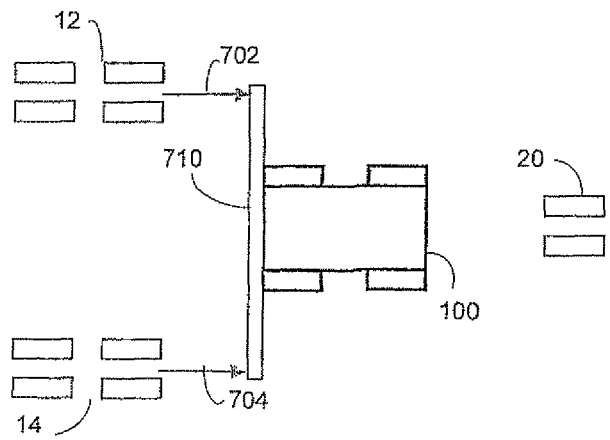
Figure 24:
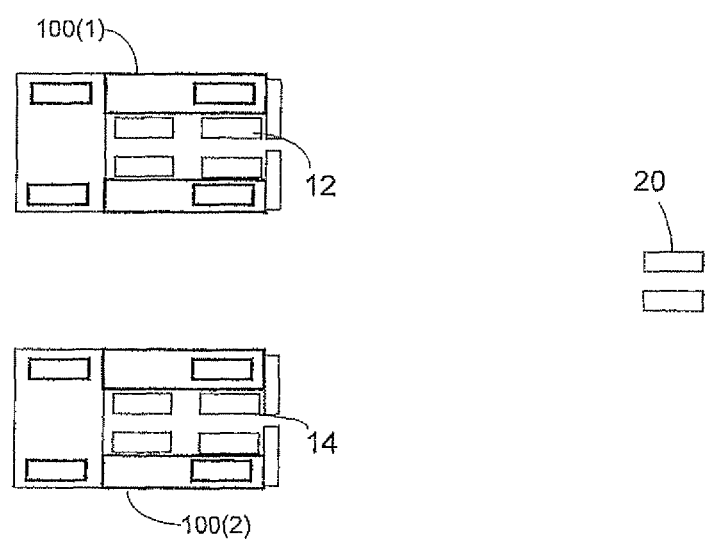
FIG. 24 illustrates two unmanned airplane transfer systems that move two read landing gears of an airplane according to an embodiment of the invention.
Figure 26:
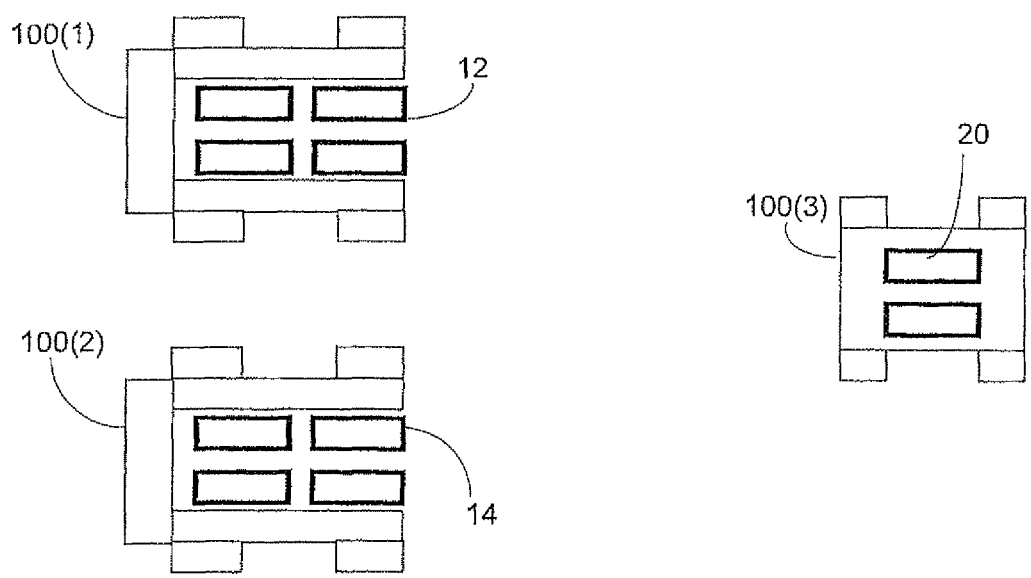
FIG. 26 illustrates multiple unmanned airplane transfer system that move by towing or by pushing multiple landing gears of an airplane, according to an embodiment of the invention.

FIG. 26 illustrates three unmanned airplane transfer systems that move a nose landing gear of an airplane and two rear landing gears of an airplane. FIGS. 20a, 20b and 20c illustrate unmanned airplane transfer systems that tow two rear landing gears of an airplane. FIG. 24 illustrates two unmanned airplane transfer systems that move two read landing gears of an airplane. It is noted that these are examples only. Multiple unmanned airplane transfer systems can move (push and/or tow) any combination of landing gear of an airplane.

Figure 21A:
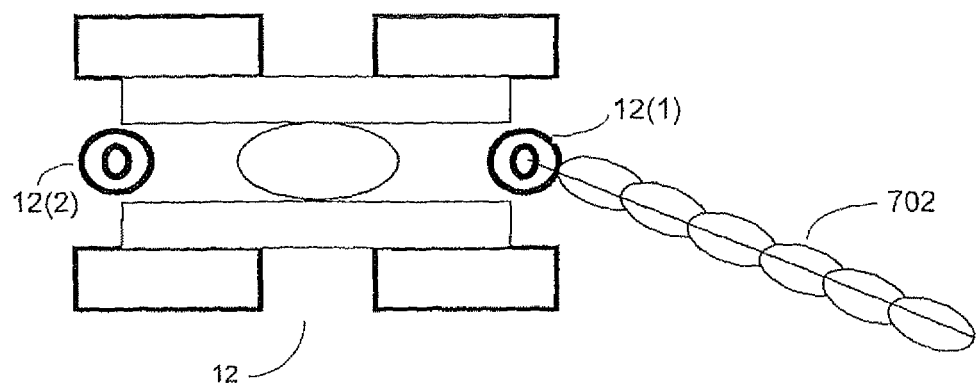
FIGS. 21a and 21b illustrate a towing of a rear landing gear an airplane, according to an embodiment of the invention.
Figure 21B:
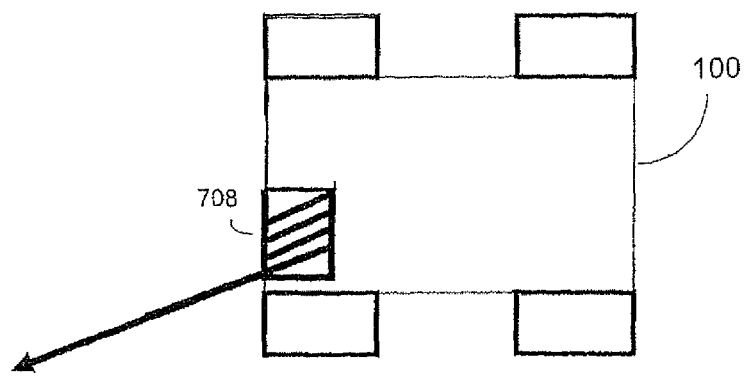

FIGS. 20a, 21a and 21b illustrates towing landing gears by a towing chain or a towing cable wherein during a towing of a rear landing gear along a certain direction the towing cable or towing chain substantially deviates from that certain direction.

Figure 22:
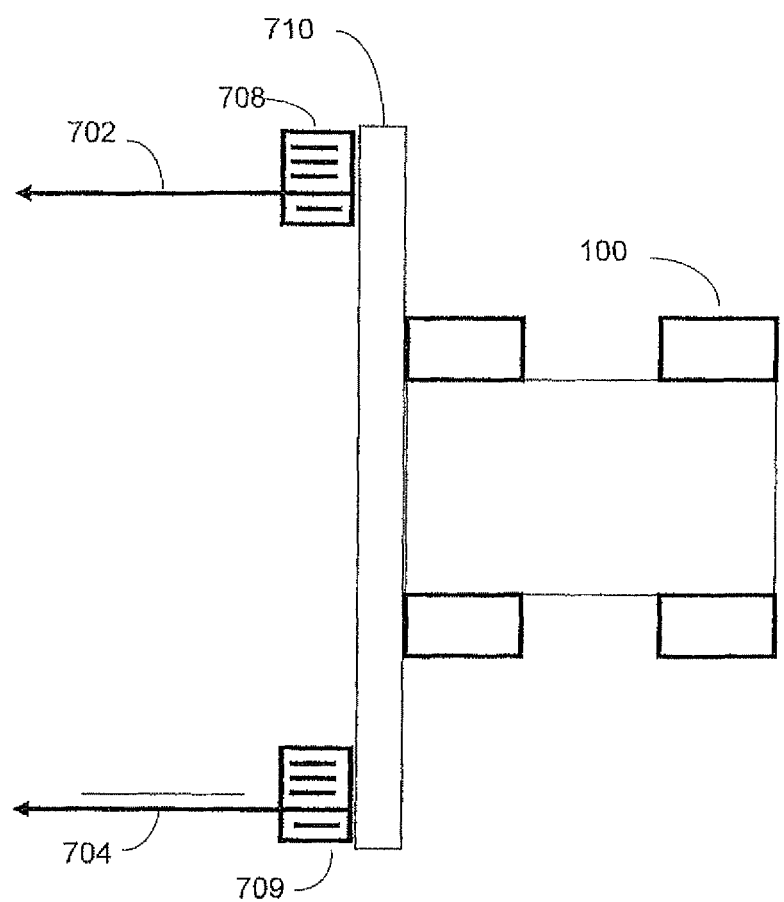
FIG. 22 illustrates a unmanned airplane transfer system that tows two rear landing gears of an airplane according to an embodiment of the invention.

FIGS. 20b, 20c and 22 illustrate towing landing gears by a towing chain or a towing cable wherein during a towing of a rear landing gear along a certain direction the towing cable is substantially parallel to the certain direction.

It is noted that the mentioned figures illustrate just two examples of the angular relationships between the towing cables or towing chains and the direction in which the rear landing gears are towed.

It is noted that when a pair of rear landing gears are connected via adjustable towing elements to the unmanned airplane transfer systems the released portion of one towing element can be longer than the released portion of the other towing element. The released portion defines the distance between the real landing gear and the unmanned airplane transfer system is tilted to the right. Referring to FIG. 22, and assuming that the airplane that is towed by towing cables or towing chains 702 and 704 turns to the left then the released portion towing cables or towing chains 702 will be shorter (it will be pulled by winch 708) than the released portion of towing cables or towing chains 704 (it will be released by winch 709).

FIGS. 20a-20c illustrate various air transfer schemes of an airplane according to various embodiments of the invention.

FIG. 20a illustrates system 100 as positioned below or at least partially supporting nose landing gear 20 while towing two rear landing gears 12 and 14 by using towing elements such as towing cables or towing chains 702 and 704. It is noted that system 100 can include a winch (such as winch 708 of FIG. 21b) or other towing element that is connected to towing chains or cables 702 and 704.

FIG. 20b illustrates a scenario in which a towing element 710 that extends beyond the wheels of system 100 is connected (conveniently via winches) to towing chains or towing cables 702 and 704. Towing chains or towing cables are detachably connected to rear landing gears 12 and 14. System 100 also moves nose landing gear 20.

FIG. 20c illustrates a scenario in which a towing element 710 that extends beyond the wheels of system 100 is connected (conveniently via winches) to towing chains or towing cables 702 and 704. Towing chains or towing cables are detachably connected to rear landing gears 12 and 14. In this configuration system 100 is positioned between nose landing gear 20 and rear landing gears 12 and 14. It does not support or contact nose landing gear 20.

FIG. 21a illustrates a towing chain 702 that is detachably connected to towing elements 12(1) (out of two towing elements 12(1) and 12(2) of rear landing gear 12). Conveniently, towing element 12(1) is a ring to which a towing cable or a towing chain can be detachably connected.

FIG. 21b illustrates system 100 and winch 708. Winch is connected to the body of system 100 and can pull towing cable 708 during transfer of the airplane.

FIG. 22 illustrates in greater detail system 100 that includes towing element 710 that extends beyond the wheels of system 100. Towing element 710 can be a pole that is perpendicular to a longitudinal axis of system 100. It length can be designed such as to fit the distance between two landing gears. It is noted that poles of other lengths can define other angular relationships between the towing direction and either one of towing cable or towing chain.

Towing element 710 is connected to two winches 708 and 709. Winch 708 is connected to towing chain or towing cable 702. Winch 709 is connected to towing chain or towing cable 704.

Figure 23:
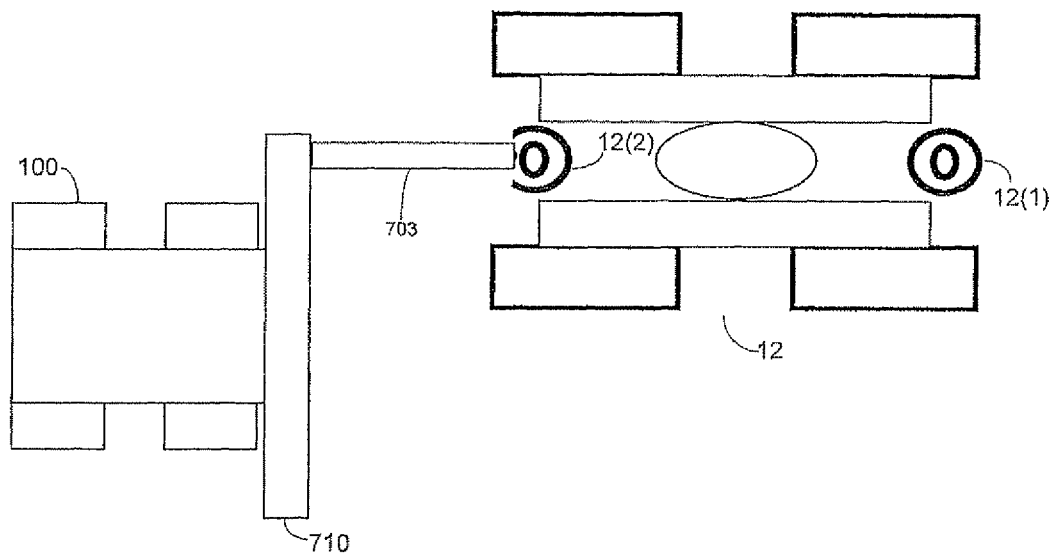
FIG. 23 illustrates a towing of a rear landing gear an airplane, according to an embodiment of the invention.

FIG. 23 illustrates system 100 pushes rear landing gear 12 by using a pushing element such as bar 703.

FIG. 24 illustrates systems 100(1) and 100(2) as either pushing or pulling rear landing gears 12 and 14. They are positioned in close proximity to landing gears 12 and 14. The nose landing gear 20 is not towed or pushed by any system.

Figure 25A:
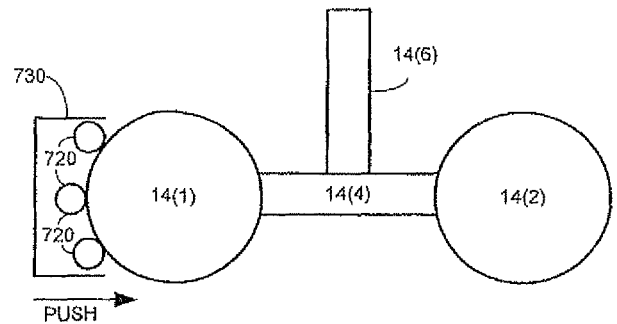
FIGS. 25a and 25b illustrate an interface with a rear landing gear according to an embodiment of the invention.

FIG. 25a illustrates an interface between system 100 and wheel 14(1) of landing gear 14 for pushing the airplane. Landing gear 14 further includes another wheel 14(2) as well as structural elements 14(4) and 14(6) that are connected to wheels and to other parts of the airplane. It is noted that FIG. 25a provide a very simplified illustration of rear landing gear 14. Rotatable elements 720 contact wheel 14(1) of rear landing gear 14. By rotating rotatable elements 720 wheel 14(1) that contacts these elements is forced to rotate—thus moving rear landing gear 14. FIG. 25a further illustrates a frame 730 that partially surrounds rotatable elements 720. It is noted that rotatable elements 720 and one or more tow motors that rotate them can be connected in various manners to system 100.

Figure 25B:
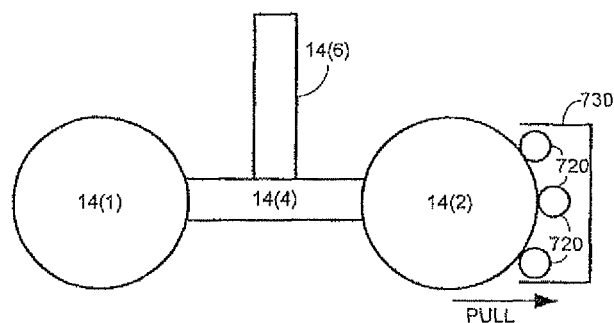

FIG. 25b illustrates three rotatable elements 720 that contact wheel 14(2) of rear landing gear 14. FIG. 25a discloses contacting rear landing gear 14 from one direction while FIG. 25b discloses contacting landing gear 14 from an opposite direction. One direction can involve pushing landing gear 14 while the other direction can be for pulling rear landing gear 14. It is also noted that a pushing or pulling effect can be achieved by determining the rotation of rotating elements—clockwise or counterclockwise.

Figure 25C:
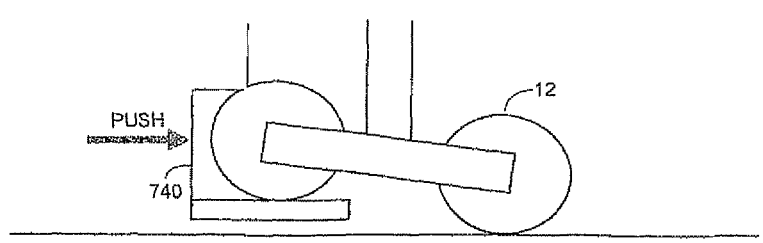
FIG. 25c illustrates a portion of a system that lifts one wheel of a landing gear, according to an embodiment of the invention.

FIG. 25c illustrate system 100 as lifting (by lifting element 740) one of the wheels of rear landing gear 12, while another wheel of that rear landing gear maintains contact with the ground. This results in better traction force and lighter unmanned airplane transfer systems.

FIG. 26 illustrates system 100(1) as positioned below or at least partially supporting rear landing gear 12, system 100(2) as positioned below or at least partially supporting rear landing gear 14 and system 100(3) as positioned below or at least partially supporting nose landing gear 20. Each of these systems can pull or push its respective landing gear.

Figure 27A:
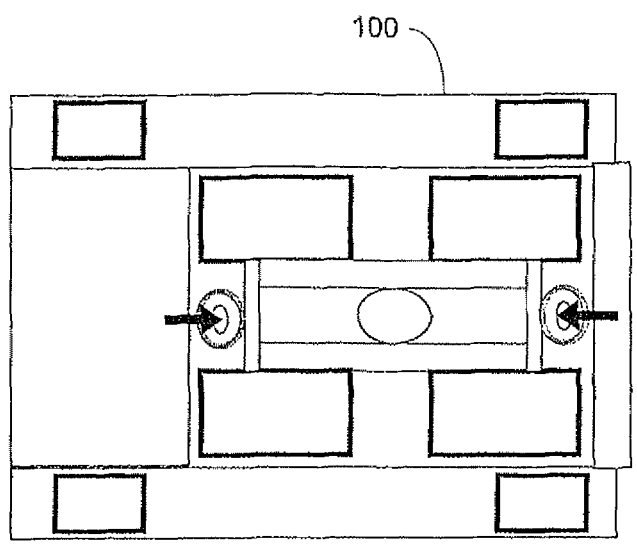
FIGS. 27a and 27b illustrates a portion of a system that lifts at least one components of a landing gear of an airplane according to an embodiment of the invention.
Figure 27B:
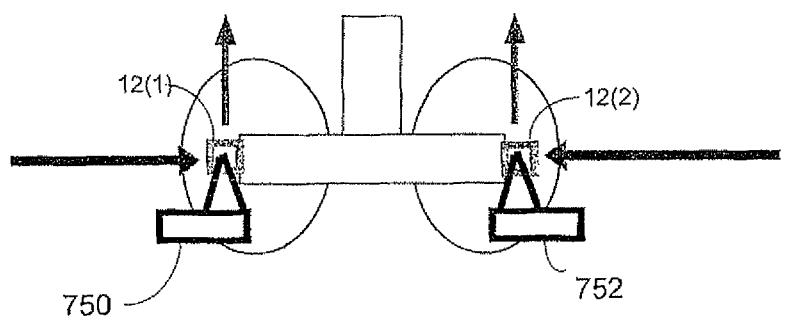

FIGS. 27a and 27b illustrate a lifting of a component such as towing bar 12(5) by unmanned airplane transfer system 100. Towing bar 12(5) has towing element 12(1) on one side and towing element 12(2) on another side. By lifting these towing elements towing bar 12(5) is lifted and part of the weight of the airplane is borne by system 100. FIGS. 27a and 27b illustrate two vertically extending pins that are connected to two horizontal bars to form lifting elements 750 and 752. It is noted that one or more components of rear landing gear 12 can be lifted in other manners. It is noted that this lifting can disconnect rear landing gear 12 from the ground but this is not necessarily so.

Referring to FIG. 13, stage 330 can include towing or pushing at least one rear landing gear of the airplane by the unmanned airplane transfer system.

In addition to the towing or pushing of at least one rear landing gear stage 330 can also include at least one of the following stages, or a combination thereof: (i) towing by the unmanned airplane transfer system at least one rear landing gear of the airplane; (ii) towing a rear landing gear along a certain direction by a towing chain or a towing cable that is substantially parallel to the certain direction; (iii) towing a rear landing gear along a certain direction by a towing chain or a towing cable that substantially deviates from the certain direction; (iv) towing multiple landing gears by multiple towing chains or towing cables that are coupled to a towing member that extends beyond the wheels of the transfer module; (v) towing the landing gear by a system that at least partially supports a nose landing gear; (vi) towing a landing gear while lifting at least one component of a landing gear; (vii) interfacing with a wheel of the rear landing gear by at least one rotatable element; (viii) sensing a movement of the airplane control components and generating a transfer signal; (ix) sensing, by an unmanned airplane transfer system, steering control induced movements of a landing gear of the airplane; (ix) transferring the airplane in response to remotely transmitted commands; (xi) transferring comprises independently controlling at least two independently controlled wheels; (xii) pushing a rear landing gear of the airplane; (xiii) at least partially supporting a nose landing gear; (xiv) lifting at least one component of a landing gear; (xv) interfacing with a wheel of the rear landing gear by multiple rotatable elements; (xvi) transferring a rear landing gear in response to remotely transmitted commands; (xvii) independently controlling at least two independently controlled wheels; and (xviii) pushing multiple landing gears of the airplane.

Conveniently, stage 320 includes at least one of the following stages or a combination thereof: (i) sensing a movement of the airplane control components and generating a transfer signal; and (ii) sensing, by an unmanned airplane transfer system, steering control induced movements of a landing gear of the airplane.

It is noted that all the mentioned above alternatives, when referring to towing can also be applied mutatis mutandis to pushing the landing gear.

Figure 29:
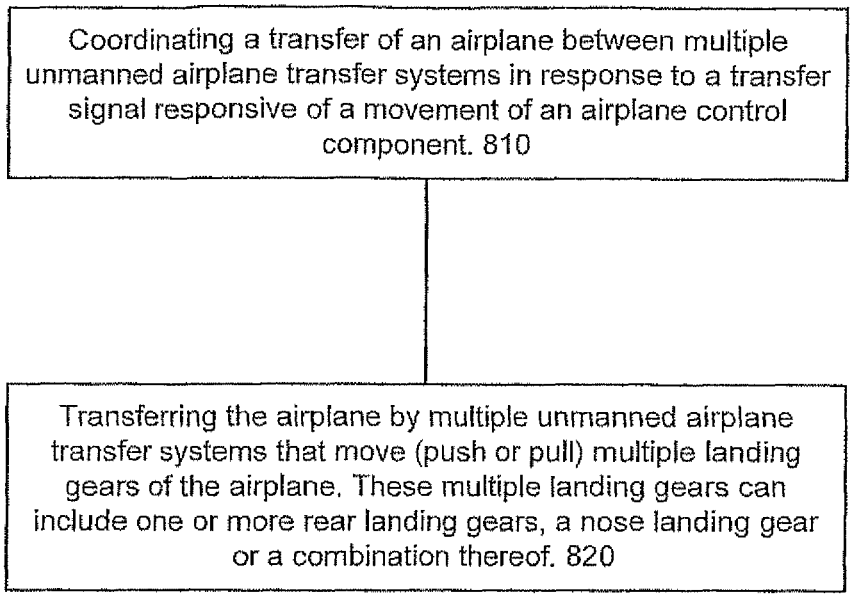
FIG. 29 illustrates a method for transferring an airplane, according to an embodiment of the invention.

FIG. 29 illustrates method 800 for transferring an airplane, according to an embodiment of the invention.

Method 800 includes stage 810 of coordinating a transfer of an airplane between multiple unmanned airplane transfer systems in response to a transfer signal responsive of a movement of an airplane control component.

Stage 810 is followed by stage 820 of transferring an airplane, by the multiple unmanned airplane transfer systems. Stage 820 can include stage 330.

Conveniently, stage 820 includes transferring the airplane by multiple unmanned airplane transfer systems that move (push or pull) multiple landing gears of the airplane. These multiple landing gears can include one or more rear landing gears, a nose landing gear or a combination thereof.

Figure 28:
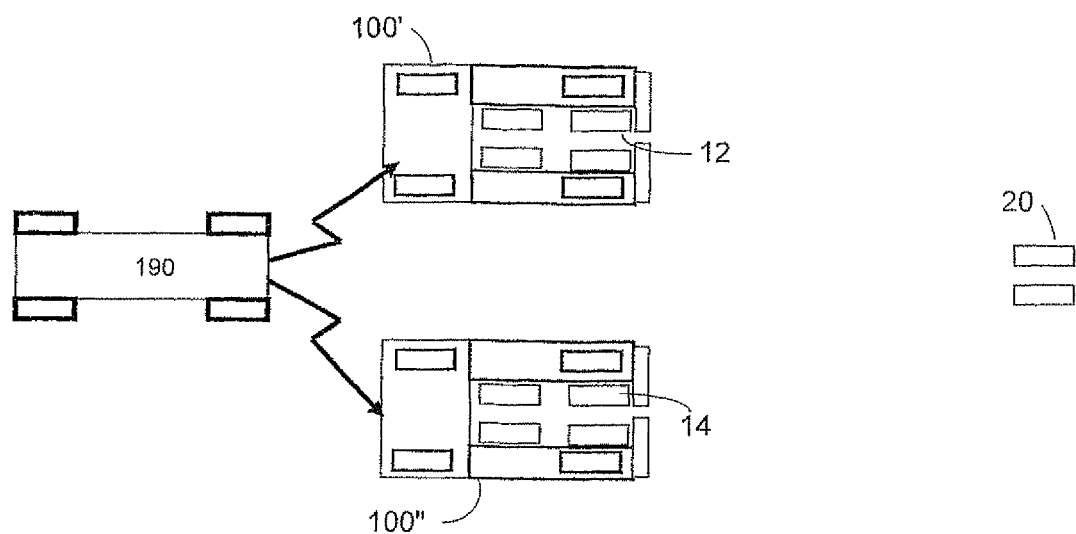
FIG. 28 illustrates a various systems according to an embodiment of the invention.

According to an embodiment of the invention stage 330 of method 300 and, additionally or alternatively, stage 820 includes receiving, by an unmanned airplane transfer system, power from another unmanned system. The power can be received by hydraulic means (such as a pneumatic unit), mechanical means, electrical means (such as cables) and the like. FIG. 28 illustrates systems 100' and 100" that receive power from unmanned system 190. Either one of systems 100' and 100" can differ from either one of systems 100, 101, 102, 103, 104 or 105 by not including a power source such as an engine 130 of FIG. 3.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

The invention claimed is:

1. An unmanned airplane transfer system, comprising:
a first unmanned airplane transfer system, the first unmanned airplane transfer system comprising:
a first transfer module comprising at least one motor and a plurality of rotatable wheels, said first transfer module being adapted to transfer an airplane by moving a first landing gear of the airplane; and
a first controller being assembled with the first unmanned airplane transfer system, coupled to the first transfer module, and adapted to
receive a transfer signal;
control speed of the first transfer module via the motor and control steering of the first transfer module via the rotatable wheels, the controlling of the speed and the steering of the first transfer module being in response to the transfer signal; and
coordinate transferring of the airplane with a second controller of at least one second unmanned airplane transfer system being similar to the first unmanned airplane transfer system, configured to move a second landing gear of the airplane,
wherein the first controller is adapted to coordinate transferring of the airplane between the first unmanned transfer system and the at least one second unmanned airplane transfer system in response to said transfer signal.

2. The first unmanned airplane transfer system of claim 1, wherein the transfer signal is responsive, at least, to one or more commands provided via an airplane control component, said commands being a priori capable of controlling the airplane and/or parts thereof.

3. The first unmanned airplane transfer system of claim 1, wherein the transfer signal is responsive, at least, to a location of the airplane.

4. The first unmanned airplane transfer system of claim 1, wherein said first landing gear of the airplane is a nose landing gear of the airplane which said first transfer module is adapted to transfer, and said first unmanned airplane transfer system further comprises a sensor adapted to sense a steering control induced movement of the nose landing gear of the airplane and, in response, to provide the transfer signal to the first controller.

5. The first unmanned airplane transfer system of claim 1, wherein said second unmanned airplane transfer system comprises a second transfer module which comprises at least one motor and adapted to transfer an airplane by moving a second landing gear of the airplane.

6. The first unmanned airplane transfer system of claim 5, wherein said at least one second landing gear is a rear landing gear of the airplane.

7. The first unmanned airplane transfer system of claim 5, wherein said at least one second landing gear and said first landing gear are rear landing gears of the airplane.

8. The first unmanned airplane transfer system of claim 1, wherein said at least one second unmanned airplane transfer system moves at least the first landing gear of the airplane.

9. The first unmanned airplane transfer system of claim 1, wherein the transfer module comprises at least one towing element; said towing element is operative to tow at least one landing gear of the airplane and is adapted for detachably coupling to at least one rear landing gear of the airplane.

10. A method of transferring an airplane by a plurality of unmanned airplane transfer systems, including at least a first unmanned airplane transfer system having at least one motor, a plurality of rotatable wheels and a first controller and configured to move a first landing gear, and a second unmanned airplane transfer system, being similar to the first unmanned airplane transfer system, and having a second controller and configured to move a second landing gear, the method comprising:
receiving a transfer signal by at least one among said first and second controllers of said first and second transfer systems, and
in response to the transfer signal, controlling speed of at least one among the first and second transfer systems via the motor and controlling steering of at least one among the first and second transfer systems via the rotatable wheels,
wherein the first controller is adapted to coordinate transferring of the airplane, with the second controller, between the first airplane transfer system and the second airplane transfer system in response to said transfer signal.

11. The method of claim 10, wherein the transfer signal is responsive, at least, to a location of the airplane.

12. The method of claim 10, wherein the transfer signal is responsive, at least, to one or more commands provided via an airplane control component, said commands being a priori capable of controlling the airplane and/or parts thereof.

13. The method of claim 10, further comprising sensing the steering induced movement of a landing gear of the airplane by at least one of said first and second unmanned airplane transfer systems and, in response, providing the transfer signal.

14. The method of claim 10, wherein transferring comprises applying skid steering and maintaining an alignment between at least one unmanned airplane transfer system and the airplane during rotational movements of the airplane.

15. The method of claim 10, wherein said plurality of unmanned airplane transfer systems moves multiple landing gears of the airplane.

16. The method of claim 15, wherein the multiple landing gears comprise at least one rear landing gear and a nose landing gear.

17. The method of claim 15, wherein the multiple landing gears comprise at least two rear landing gears.

18. The method of claim 10, comprising pushing multiple landing gears of the airplane.

19. The method of claim 10, comprising towing multiple landing gears of the airplane.

20. The method of claim 10, wherein transferring comprises towing at least one rear landing gear along a certain direction with a help of a towing chain or a towing cable that is substantially parallel to said certain direction.

21. The method of claim 10, wherein transferring comprises towing at least one rear landing gear along a certain direction with a help of a towing chain or a towing cable that substantially deviates from said certain direction.

22. The method of claim 10, wherein transferring comprises interfacing with a wheel of the rear landing gear by at least one rotatable element constituting a part of unmanned transfer system.

23. The method of claim 10, wherein transferring comprises towing multiple landing gears by multiple towing chains or towing cables that are coupled to a towing member of at least one unmanned transfer system.

24. The method of claim 10, wherein transferring comprises pushing a rear landing gear of the airplane.

25. The method of claim 10, wherein transferring comprises at least partially supporting a nose landing gear.

26. The method of claim 10, wherein transferring comprises lifting at least one component of a landing gear.

27. The system of claim 5, wherein said second controller being assembled with the second unmanned airplane transfer system, coupled to the second transfer module, and adapted to:
receive a transfer signal;
to control the second transfer module in response to the transfer signal; and
to coordinate transferring of the airplane between the first unmanned airplane transfer system and the second unmanned airplane transfer system.

* * * * *